United States Patent
Turcan et al.

(10) Patent No.: US 7,356,139 B2
(45) Date of Patent: *Apr. 8, 2008

(54) COMPUTER TELEPHONY INTEGRATION (CTI) COMPLETE HOSPITALITY CONTACT CENTER

(75) Inventors: Diane Brown Turcan, Smyrna, GA (US); David L. Wellons, Marietta, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 548 days.

This patent is subject to a terminal disclaimer.

(21) Appl. No.: 10/335,280

(22) Filed: Dec. 31, 2002

(65) Prior Publication Data

US 2004/0125940 A1    Jul. 1, 2004

(51) Int. Cl.
*H04M 3/00* (2006.01)

(52) U.S. Cl. .................. 379/265.13; 379/265.01; 379/265.02; 379/265.11; 379/266.01; 379/266.03; 379/266.1

(58) Field of Classification Search ........... 379/265.13, 379/265.01, 265.02, 265.11, 266.01, 266.03, 379/266.1
See application file for complete search history.

(56) References Cited

U.S. PATENT DOCUMENTS

| | | | |
|---|---|---|---|
| 4,817,130 A | 3/1989 | Frimmel, Jr. | |
| 4,979,206 A | 12/1990 | Padden et al. | |
| 5,062,103 A | 10/1991 | Davidson et al. | |
| 5,062,133 A | 10/1991 | Melrose | |
| 5,113,429 A | 5/1992 | Morley, Jr. et al. | |
| 5,418,628 A | 5/1995 | Perkins | |
| 5,651,058 A | 7/1997 | Hackett-Jones et al. | |
| 5,678,179 A * | 10/1997 | Turcotte et al. | 455/466 |
| 5,711,297 A | 1/1998 | Iliff | |
| 5,748,100 A * | 5/1998 | Gutman et al. | 340/7.22 |
| 5,815,566 A | 9/1998 | Ramot et al. | |
| 5,822,418 A * | 10/1998 | Yacenda et al. | 379/201.07 |
| 5,841,854 A * | 11/1998 | Schumacher et al. | 379/265.11 |
| 5,868,669 A | 2/1999 | Iliff | |
| 5,878,130 A | 3/1999 | Andrews et al. | |
| 5,917,893 A | 6/1999 | Katz | |
| 5,924,074 A | 7/1999 | Evans | |
| 5,940,740 A * | 8/1999 | Aas et al. | 340/7.22 |
| 5,963,864 A | 10/1999 | O'Neil | |
| 6,011,844 A | 1/2000 | Uppaluru et al. | |
| 6,035,021 A | 3/2000 | Katz | |
| 6,052,442 A | 4/2000 | Cooper et al. | |
| 6,122,485 A * | 9/2000 | Archer | 340/7.22 |
| 6,137,524 A | 10/2000 | Chea | |

(Continued)

OTHER PUBLICATIONS

MediCall™ The Complete Call Center Solution for the Healthcare Industry, XTEND, 171 Madison Avenue, New York, NY 10016 212.951.7681, www.xtend.com.

(Continued)

*Primary Examiner*—Quynh H. Nguyen
(74) *Attorney, Agent, or Firm*—Scott P. Zimmerman, PLLC

(57) ABSTRACT

Methods and systems are disclosed for enabling a dynamic hospitality contact center (DHCC) that leverages the assets of a hospitality center's communications systems including internal telecommunications networks, information systems, data networks, and applications, of public telecommunications networks, of public data networks, and/or of various communications devices to facilitate improved access, sharing, notification, and/or management of incoming calls and associated data.

19 Claims, 13 Drawing Sheets

U.S. PATENT DOCUMENTS

| | | | |
|---|---|---|---|
| 6,137,876 | A | 10/2000 | Wong et al. |
| 6,151,586 | A | 11/2000 | Brown |
| 6,201,804 | B1 | 3/2001 | Kikinis |
| 6,206,829 | B1 | 3/2001 | Iliff |
| 6,229,888 | B1 | 5/2001 | Miloslavsky |
| 6,295,551 | B1 | 9/2001 | Roberts et al. |
| 6,305,007 | B1 | 10/2001 | Mintz |
| 6,310,543 | B1 | 10/2001 | Yoshioka et al. |
| 6,339,593 | B1 | 1/2002 | Kikinis |
| 6,366,658 | B1 | 4/2002 | Bjornberg et al. |
| 6,434,121 | B1 | 8/2002 | Davidson et al. |
| 6,445,784 | B2 | 9/2002 | Uppaluru et al. |
| 6,456,594 | B1 | 9/2002 | Kaplan et al. |
| 6,462,656 | B2 * | 10/2002 | Ulrich et al. ............ 340/539.1 |
| 6,473,404 | B1 | 10/2002 | Kaplan et al. |
| 6,482,156 | B2 | 11/2002 | Iliff |
| 6,721,412 | B1 * | 4/2004 | Youngs ................. 379/204.01 |
| 6,771,173 | B1 | 8/2004 | Clayton et al. |
| 6,810,429 | B1 | 10/2004 | Walsh et al. |
| 6,859,649 | B1 * | 2/2005 | Denenberg et al. ......... 455/406 |
| 2002/0004727 | A1 | 1/2002 | Knaus et al. |
| 2002/0010679 | A1 | 1/2002 | Felsher |
| 2002/0055917 | A1 | 5/2002 | Muraca |
| 2002/0055987 | A1 | 5/2002 | Coussement |
| 2002/0068575 | A1 | 6/2002 | Agrawal et al. |
| 2002/0076026 | A1 | 6/2002 | Batten |
| 2002/0106071 | A1 | 8/2002 | Uppaluru et al. |
| 2002/0112008 | A1 | 8/2002 | Christenson et al. |
| 2002/0114278 | A1 | 8/2002 | Coussement |
| 2002/0120687 | A1 | 8/2002 | Diacakis et al. |
| 2002/0143876 | A1 | 10/2002 | Boyer et al. |
| 2002/0144154 | A1 * | 10/2002 | Tomkow ..................... 713/201 |
| 2002/0163572 | A1 | 11/2002 | Center, Jr. et al. |
| 2002/0167935 | A1 | 11/2002 | Nabkel et al. |
| 2002/0167936 | A1 | 11/2002 | Nabkel et al. |
| 2002/0188689 | A1 | 12/2002 | Michael |
| 2003/0009530 | A1 | 1/2003 | Philonenko et al. |
| 2003/0009630 | A1 | 1/2003 | Philonenko et al. |
| 2003/0028399 | A1 | 2/2003 | Davis et al. |
| 2003/0055684 | A1 | 3/2003 | Jaskolski et al. |
| 2003/0058838 | A1 | 3/2003 | Wengrovitz |
| 2003/0065738 | A1 | 4/2003 | Yang et al. |
| 2003/0135624 | A1 | 7/2003 | McKinnon et al. |
| 2003/0191665 | A1 | 10/2003 | Fitzgerald et al. |
| 2003/0200226 | A1 | 10/2003 | Wells et al. |
| 2003/0208543 | A1 * | 11/2003 | Enete et al. ................. 709/206 |
| 2004/0057569 | A1 | 3/2004 | Busey et al. |
| 2004/0059603 | A1 | 3/2004 | Brown, Jr. et al. |
| 2004/0117215 | A1 | 6/2004 | Marchosky |
| 2004/0193449 | A1 * | 9/2004 | Wildman et al. ............... 705/2 |
| 2004/0249776 | A1 | 12/2004 | Horvitz et al. |
| 2005/0035862 | A1 | 2/2005 | Wildman et al. |
| 2005/0065817 | A1 | 3/2005 | Mihal et al. |
| 2005/0154792 | A1 | 7/2005 | Derygin et al. |
| 2005/0209891 | A1 | 9/2005 | Jacobes et al. |

OTHER PUBLICATIONS

Paging Gateway A Wireless communications Solutions for Any Industry, XTEND, 171 Madison Avenue, New York, NY 10016 212.951.7681, www.xtend.com.

XPress Desk™ The Complete Call Center Solution for the Hotel Industry, XTEND, 171 Madison Avenue, New York, NY 10016 212.951.7681, ww.xtend.com.

BellSouth Call Logix, BellSouth Corporation Headquarters, 1155 Peachtree St. NE, Atlanta, GA 30309-3610, www.bellsouth.com.

* cited by examiner

COMPUTER TELEPHONY INTEGRATION (CTI) COMPLETE HOSPITALITY CONTACT CENTER

CROSS REFERENCE

This application relates to applicants' co-pending application entitled "Computer Telephony Integration (CTI) Complete Customer Contact Center," Ser. No. 10/335,113 filed simultaneously herewith and of which the "Brief Summary of the Invention" and "Detailed Description of the Invention" sections are incorporated herein by this reference.

This application relates to applicants' co-pending application entitled "Computer Telephony Integration (CTI) Complete Healthcare Contact Center," Ser. No. 10/335,453 filed simultaneously herewith and of which the "Brief Summary of the Invention" and "Detailed Description of the Invention" sections are incorporated herein by this reference.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but the copyright owner otherwise reserves all copyrights whatsoever.

BACKGROUND OF THE INVENTION

1. Field of the Invention

This invention generally relates to computer networks and to telephony. More particularly, this invention is directed to methods and systems for more efficient and effective communication and processing of incoming communications and other electronic data in a call management and contact center system for a hospitality center.

2. Description of the Related Art

Hospitality centers (e.g., motels, hotels, resorts, spas, etc.) commonly service guests through call management and contact centers (herein after referred to as a "call center"). These call centers are staffed with support agents, interactive voice response recordings, and/or information systems to process guest inquiries across numerous communications devices and network infrastructures. Each week, hundreds, if not thousands or more, of incoming communications (including calls, emails, faxes, letters, and other communications) and associated data are received, accessed, and/or managed by the call center. The agent (or an automated call forwarding system) may forward/transfer the incoming communications and/or associated data to an extension of a staff member who can respond to the guest. Alternatively, the agent (or an automated call forwarding system) may forward/transfer the incoming communications and/or associated data to an extension of a guest to receive and/or to respond to the incoming communication (and associated data). The extension is typically associated with a physical location of a phone, such as a phone in the staff member's office or a particular location in a building. Oftentimes, the staff member (and/or the guest) is unavailable to receive the incoming communication and/or associated data because the staff member is away from the phone or because the phone cannot display or otherwise provide the associated data. For example, if the staff member is a guest services manager working in a resort, then the manager may be located at numerous locations throughout the day, such as common areas, such as the lobby, restaurant, and recreational areas, conference rooms for meetings, and guest rooms (such as to resolve a guest's concern). Thus, the manager travels to multiple locations at different times throughout the day as guest loads, meeting times, entertainment and recreations services, guest complaints/concerns, and other changes make it difficult to have a predictable schedule and location. While some managers carry paging devices, these paging devices tend to have limited service areas that restrict communications outside of a geographic area and limited functionality that restricts an incoming communication to a short text message such as a phone number. These paging devices also do not transmit communications and/or data back to the call center such as confirmations that the incoming communication was reviewed, location of the paging device (e.g., paging device of Ms. Williamson is located on $3^{rd}$ floor/Island Grande building near Suite 311), and so on. Still further, most people today tend to carry multiple communications devices, such as a pager, personal digital assistant (PDA), and cell phone. However, the call center of a hospitality center does not leverage the multiple communications devices of a staff member (and/or of the guest) because each of these communications devices is customized in terms of software, hardware, and network configuration. For example, the PDA and the cell phone have different software applications, data processing, storage, management, and communications systems.

As discussed above, one of the biggest barriers facing a call center is locating and accessing multiple communications devices utilized by the staff (and/or the guests) of the hospitality center. In addition, the incoming communications and associated data of the call center must be in a format that can easily be exchanged or otherwise shared with each communications device. For example, if the agent wants to share contact information (e.g., name, phone numbers, addresses, etc.) with a cell phone and a pager of a staff member, then the agent typically must enter this information twice—once on a platform communicating with the cell phone and once on a platform communicating with the pager. Another barrier is providing the incoming communication and/or associated data in a standardized or otherwise compatible data format, depending on functionality limitations of the communications device, so that each communications device has efficient and effective access to the information. For example, conventional wireless phones have limited functionality compared with personal computers (PC). Typically, wireless telephones provide limited contact information, such as a telephone listing by name rather than full address books and/or calendars. Additionally, conventional wireless telephones are unable to run application/software packages and may have limited capabilities for transmitting, receiving, and displaying video data.

To further complicate operations of the call center, most hospitality centers must work with several vendors who each provide only a portion of the required call management and contact center system. Further, these hospitality centers often do not have the technical staff to design, select, and integrate network(s), hardware and equipment, software, and/or develop customized applications. Even after the hospitality center has purchased the required components, they have difficulty integrating these components into existing infrastructures, and most often, end up with several call centers that do not provide access to information and/or to staff (and/or guests) across the entire enterprise. As a result, hospitality centers limp along with many different, non-integrated communications networks and call center systems.

Accordingly, hospitality centers need integrated call management and contact center systems and methods that can provide immediate access to resources (e.g., staff and data) and guests, improve operator productivity, increase guest satisfaction, and control costs. The integrated call management and contact center systems and methods must support various communications infrastructures to capitalize on emerging communications devices such as, for example, interactive pagers, on-site pagers, wireless phones, personal computers, etc. Consequently, the integrated call management and contact center systems and methods should enable sharing, transferring, and/or accessing staff, data, and/or guests over various communications devices while also complying with information system requirements of the hospitality center, such as security/privacy and fail-safe requirements.

BRIEF SUMMARY OF THE INVENTION

The aforementioned problems and others are solved by a dynamic computer telephony integration (CTI) complete hospitality contact center (hereinafter referred to as the "dynamic hospitality contact center"). The dynamic hospitality contact center (DHCC) comprises systems and methods that leverage the assets of a hospitality center's communications systems including internal telecommunications networks, information systems, data networks, and applications, of public telecommunications networks (e.g., public switched telephone network (PSTN) or mobile telecommunications switching office (MTSO)), of public data networks (e.g., Internet), and/or of various communications devices of a staff member and/or a guest in order to facilitate improved access, sharing, notification, and/or management of incoming calls and associated data of the hospitality's call center. Some advantages of the dynamic hospitality contact center include faster access to guests, faster access to staff and data, ability to communicate incoming calls and data to staff (and/or a guest) over a variety of communications devices, less operator/agent intervention, and increased emergency recovery capabilities.

An embodiment of this invention describes a computer telephony integration (CTI) system having a call management system for connecting a plurality of agent stations with at least one telephone line. Typically, the agent station includes a personal computer and/or a telephone that the agent uses to answer, respond to, and/or transfer incoming communications (including associated data) to a call center. The system includes detection means for detecting the incoming communication, an input/output processor to input and to output data associated with the incoming communication, a communications interface for communicating the incoming communication and/or associated data with a communications device associated with a designated party (e.g., staff and/or guest) of the call center, a memory device for storing the data, a processor communicating with the memory device, and a call center application for managing a communications profile. The processor selects data stored in the memory device based upon the communications profile, and typically includes information about (1) guest data associated with the incoming communication, (2) data associated with the designated party, (3) data associated with at least one of services, products, and business operations affiliated with the hospitality call center, (4) data associated with network configuration, (5) data associated with a configuration profile of the communications device, and (6) data associated with communications systems of the hospitality call center. Further, the communications interface may include means for providing messaging delivery means for delivering and confirming receipt/review of the incoming communication (including associated data). In various embodiments, the communications device may be a transmitter, a telephone, an intercom communications device, a personal computer, a wireless communications device, an on-site pager, a mobile phone, a wireless phone, a WAP phone, an IP phone, a satellite phone, a computer, a modem, a pager, a digital music device, a digital recording device, a personal digital assistant, an interactive television, a digital signal processor, a Global Positioning System device, and other similar communications devices.

In another embodiment, the system further includes status means for communicating a status of the communications device associated with the designated party of the call center to the call center application. Typically, the status provides information about availability and/or location of the designated party, availability and/or location of the communications device, messaging delivery capabilities of the communications device, and/or messaging delivery confirmation to the communications device. Further, the system may include status processing means that use the status to provide routing instructions to the communications interface for connecting the incoming call and/or associated data with the communications device.

In another embodiment, the system further includes an interactive guest services system for managing guest services provided to a guest, such as, for example, services related to business services, entertainment services, hotel services, concierge services, restaurant services, travel services, tourist services, and childcare services. In addition, the system may also include a guest signaling key that is capable of transmitting signals to a transmitter communicating with the hospitality call center. The guest signaling key is associated with the guest so that the transmitted signals can be used to locate the guest and provide availability data and/or location data of the guest.

Another embodiment describes a method for communicating an incoming communication to a call management system or other similar system (e.g., private branch exchange (PBX)) that connects at least one agent station with at least one telephone line, associating a communications profile with the incoming communication, accessing a communications network and/or an interactive guest services system of the call center to determine a status, and based upon the status, communicating the incoming communication and/or data to the communications device of a designated party (e.g., a staff member and/or a guest). Similar to above, the status provides information about availability and/or location of the designated party, availability and/or location of the communications device, messaging delivery capabilities of the communications device, and/or messaging delivery confirmation to the communications device. Further, the system may include status processing means that use the status to provide routing instructions to the communications interface for connecting the incoming call and/or associated data with the communications device.

Still, a further embodiment describes a network of interconnected communications devices associated with a call center, a rule-based application DataServer for managing the exchange of an incoming communication and/or associated data between an agent station of the call center and a communications device of a designated party (a staff member and/or a guest) affiliated with the call center, and an application program installed in the agent station. According to this embodiment, the application program allows an agent to manage a communications profile associated with (1) guest data associated with the incoming communication, (2) data associated with the designated party, (3) data associated with at least one of services, products, and business operations affiliated with a call center, (4) data associated with network configuration, (5) data associated with a configuration profile of a communications device associated with the designated party of the call center, and (6) data associated with communications systems of the call center.

BRIEF DESCRIPTION OF THE SEVERAL VIEWS OF THE DRAWINGS

The above and other embodiments, objects, uses, advantages, and novel features of this invention are more clearly understood by reference to the following description taken in connection with the accompanying figures, wherein.

DETAILED DESCRIPTION OF THE INVENTION

Figure 1:
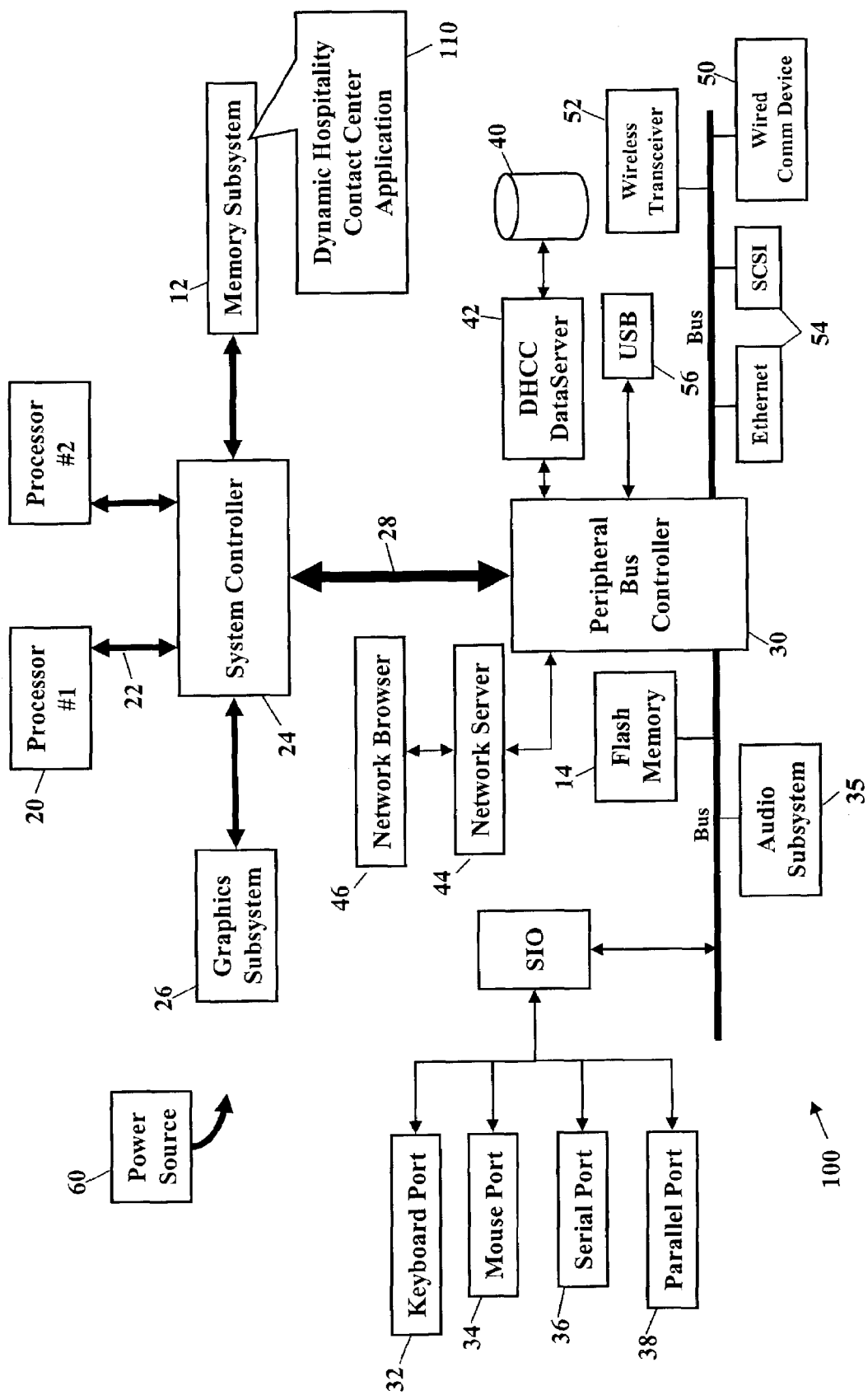
FIG. 1 is a block diagram showing of an exemplary dynamic hospitality contact center (DHCC) application operating in an agent station according to an embodiment of this invention.

This invention now will be described more fully hereinafter with reference to the accompanying drawings, in which exemplary embodiments are shown. This invention may, however, be embodied in many different forms and should not be construed as limited to the embodiments set forth herein; rather, these embodiments are provided so that this disclosure will be thorough and complete, and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

The aforementioned problems and others are solved by a dynamic computer telephony integration (CTI) complete hospitality contact center (hereinafter referred to as the "dynamic hospitality contact center"). The dynamic hospitality contact center (DHCC) comprises systems and methods that leverage the assets of a hospitality center's communications systems including internal telecommunications networks, information systems, data networks, and applications, of public telecommunications networks (e.g., public switched telephone network (PSTN) or mobile telecommunications switching office (MTSO)), of public data networks (e.g., Internet), and/or of various communications devices of a staff member and/or a guest in order to facilitate improved access, sharing, notification, and/or management of incoming calls and associated data of the hospitality's call center. Some advantages of the dynamic hospitality contact center include faster access to guests, faster access to staff and data, ability to communicate incoming calls and data to staff (and/or a guest) over a variety of communications devices, less operator/agent intervention, and increased emergency recovery capabilities. As used herein, the term "data" includes electronic information, such as information and/or files stored in a database, electronic messages such as email, notifications, replies, and/or other means of communicating electronic information between or among the hospitality's communications system (including the agent station), the public telecommunications networks, the public data networks, and/or of various communications devices of a designated party.

Referring now to the figures, FIG. 1 is a block diagram showing a Dynamic Hospitality Contact Center (DHCC) Application 110 residing in an agent station 100. The DHCC Application 110 operates within a system memory device. The DHCC Application 110, for example, is shown residing in a memory subsystem 12. The DHCC Application 110, however, could also reside in flash memory 14 and/or in a peripheral storage device, such as storage device 40 associated with a DHCC DataServer 42. The agent station 100 also has one or more central processors 20 executing an operating system. The operating system, as is well known, has a set of instructions that control the internal functions of the agent station 100. A system bus 22 communicates signals, such as data signals, control signals, and address signals, between the central processors 20 and a system controller 24 (typically called a "Northbridge"). The system controller 24 provides a bridging function between the one or more central processors 20, a graphics subsystem 26, the memory subsystem 12, and a PCI (Peripheral Controller Interface) bus 28. The PCI bus 28 is controlled by a Peripheral Bus Controller 30. The Peripheral Bus Controller 30 (typically called a "Southbridge") is an integrated circuit that serves as an input/output hub for various peripheral ports. These peripheral ports could include, for example, a keyboard port 32, a mouse port 34, a serial port 36 and/or a parallel port 38. Additionally, these peripheral ports would allow the agent station to communicate with a variety of communications devices through ports 54 (such as SCSI or Ethernet), Wireless Transceiver 52 (using the IEEE Wireless standard 802.11 and Infrared), and Wired Comm Device Port 50 (such as modem V90+ and compact flash slots). The Peripheral Bus Controller 30 could also include an audio subsystem 35. Additionally, the agent station may include a network server 44 operating with a network browser 46. The DHCC DataServer 42, the network server 44, and the network browser 46 may be stand alone or integrated components. Still further, the agent station 100 may include a power source 60, such as a rechargeable battery to provide power and allow the agent station 100 to be portable. The power source 60 may additionally or alternatively include an alternating current (AC) power source or power converter.

The processor 20 is typically a microprocessor. Advanced Micro Devices, Inc., for example, manufactures a full line of microprocessors, such as the ATHLON™ (ATHLON™ is a trademark of Advanced Micro Devices, Inc., One AMD Place, P.O. Box 3453, Sunnyvale, Calif. 94088-3453, 408.732.2400, 800.538.8450, www.amd.com). Sun Microsystems also designs and manufactures microprocessors (Sun Microsystems, Inc., 901 San Antonio Road, Palo Alto Calif. 94303, www.sun.com). The Intel Corporation manufactures microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com).

The preferred operating system is a LINUX® or a RED HAT® LINUX-based system (LINUX® is a registered trademark of Linus Torvalds and RED HAT® is a registered trademark of Red Hat, Inc., Research Triangle Park, North Carolina, 1-888-733-4281, www.redhat.com). Other operating systems, however, may be suitable. Such other operating systems would include a UNIX®-based system (UNIX® is a registered trademark of The Open Group, 44 Montgomery Street, Suite 960, San Francisco, Calif. 94104, 415.374.8280, www.opengroup.org). and Mac® OS (Mac® is a registered trademark of Apple Computer, Inc., 1 Infinite Loop, Cupertino, Calif. 95014, 408.996.1010, www.apple.com). Another operating system would include DOS-based systems. WINDOWS® and WINDOWS NT® are common examples of DOS-based systems (WINDOWS® and WINDOWS NT® are registered trademarks of Microsoft Corporation, One Microsoft Way, Redmond Wash. 98052-6399, 425.882.8080, www.Microsoft.com).

The system memory device (shown as memory subsystem 12, flash memory 14, or peripheral storage device 40) may also contain one or more application programs. For example, an application program may cooperate with the operating system and with a video display unit (via the serial port 36 and/or the parallel port 38) to provide a Graphical User Interface (GUI) display for the DHCC Application 110 (e.g., GUI displays for a staff and/or guest directory, a work profile of a staff member, a guest profile of a hospitality guest, a messaging screen for inputting a message and/or associated data, and a communications profile associated with the work profile, guest profiles, status, and/or business requirements). The GUI typically includes a combination of signals communicated along the keyboard port 32 and the mouse port 34. The GUI provides a convenient visual and/or audible interface with the user of the agent station 100. As is apparent to those of ordinary skill in the art, the selection and arrangement of the DHCC Application 110 may be programmed over a variety of alternate mediums, such as, for example, a voice-activated menu prompt.

Typically, the DHCC Application 110 is running on the workstation 100 when the incoming communication (including communications from external communications systems as well as communications initiated within the hospitality center) is detected at the call management system (or other similar system) by an automated call management and/or call routing system. The incoming communication is commonly an incoming telephone call associated with data (using responses input by an individual and/or using the address of the incoming communication) that triggers the DHCC DataServer 42 to provide a communications profile of associated data along with the incoming communication to the workstation 100 (similar to decoding an ICLID signal for telecommunication special service features offered by telecommunication service providers). Alternatively, the incoming communication may be an electronic message (e.g., email), facsimiles, and/or other communications. The DHCC Application 110 allows an agent (or other authorized staff) of a call center to manage services provided by the dynamic hospitality contact center, such as: (1) accessing a staff directory including work profiles that provide up-to-date detailed information about the staff member, such as looking up the name of the staff member, a status of the staff member, and other information of the staff member (e.g., job title, job description, business department, business address, office hours, business associates such as secretaries, communications devices including personally owned/operated and employer affiliated, and routing addresses of the communications devices such as radio frequency identifiers, service node addresses, EP addresses, email addresses, and/or other electronic address information); (2) accessing a guest directory including guest profiles that provide up-to-date detailed information about the guest, such as looking up the name and/or hotel room of the guest, a status of the guest, communications devices affiliated with a guest, routing addresses of the communications devices such as radio frequency identifiers, service node addresses, IP addresses, email addresses, and/or other electronic address information, and other information associated with the guest, such as information stored in an interactive guest system (as shown in reference numeral 1210 of FIG. 12) including preferences for wake-up times, maid service, room service, entertainment services, schedules and/or itineraries, names of other parties staying in the hotel room of the guest, financial information; (3) messaging options, such as taking, saving (e.g., email, voicemail, journal, etc.), retrieving, distributing (e.g., routing to one or more designated parties, delivery options including dates, times, priorities, etc.), and modifying a message; (4) issuing a query to determine the status of the designated party (e.g., staff member or guest); (5) customizing the communications profile associated with DHCC DataServer 42 including an access agent, a messaging agent, and a hospitality center requirements agent; (6) customizing presentation, features, and/or management of the incoming communication and/or associated data; and (7) controlling communications outside of the hospitality's communications system, such as communications with a telecommunications network and/or a data network. For example, the agent (or the automatic call distributor using response rules received from an interactive response system) may interact with the Access Agent to control up-to-date staff and/or guest directories, search for the designated party, use the work profile, the guest profile, and/or the communications profile to launch a query to determine the status, receive the status, and communicate the status to a Messaging Agent to manage communications with the designated party.

In an embodiment, the DHCC DataServer 42 has the ability to communicate with various networks, including internal and external telecommunications and/or data networks using appropriate protocols, such as standard transmission control protocol and Internet protocol (TCP/IP). The communications profiles stored by the DHCC DataServer 42 provide increased security by allowing the hospitality center to internally control electronic data, utilize existing databases to add, delete, or otherwise change electronic data, and control how the hospitality's communications system interacts with non-proprietary networks and communications devices, such as controlling routing instructions. Thus, DHCC DataServer 42 functions as a computer server, database, and processor and is dedicated to managing DHCC activity over the hospitality's proprietary and non-proprietary networks.

The DHCC Application 110 also allows the agent (or another authorized staff member) to control access, sharing, notification, routing, security, management, and/or additional processing of incoming communications and associated data. For example, DHCC Application 110 allows the agent to control how the associated data is processed into the communications system of the hospitality center including (i) sending the data to a local storage device (such as local file server 216 shown in FIG. 1), or alternatively, to a remote storage device (such as a file server associated a the telecommunications service provider), (ii) archiving the data, (iii) encrypting the data, (iv) copying the data, and (v) associating the data with the communications profile. The DHCC Application 110 may be downloaded from telecommunications network 204, data network 230, or provided on a storage media (e.g., diskette, CD-ROM, or installed by the computer system manufacturer) to install on the agent workstation 100 to enable, disable, and further control a variety of DHCC Services. Still further, the DHCC Application 110 allows the agent (or other authorized staff) to customize presentation features, such as splitting a workstation screen into two viewing areas and presenting a video display of the incoming communication in one portion and presenting information associated with the Access Agent (e.g., staff directory) in the second portion.

Figure 2:
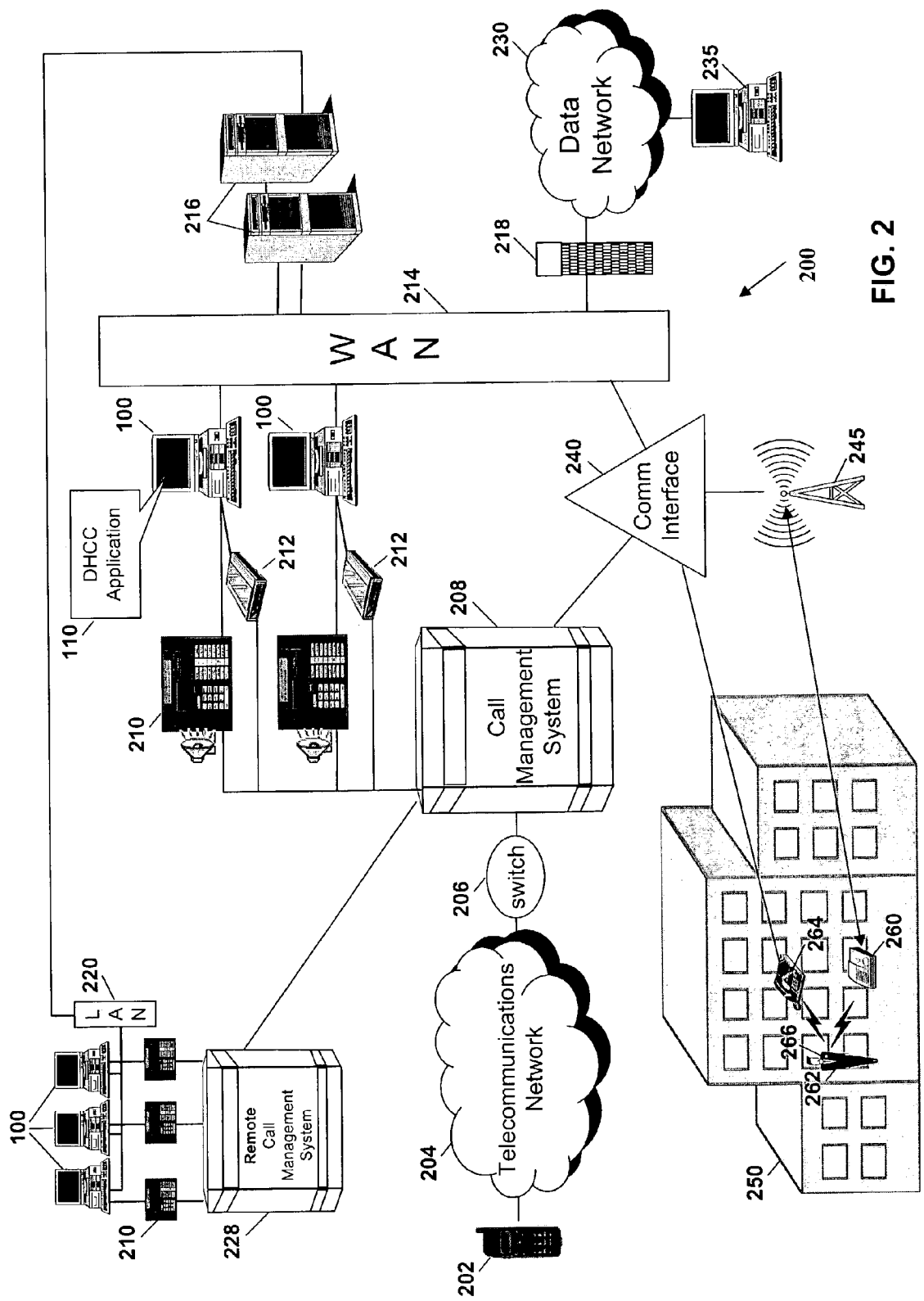
FIG. 2 is a schematic showing an exemplary operating environment for a dynamic hospitality contact center system that includes means for determining a status of a designated party and communicating with the designated party over a telephone and/or an intercom station according to an embodiment of this invention.

FIG. 2 is a schematic showing an exemplary operating environment for a dynamic hospitality contact center (DHCC) 200. The DHCC 200 includes a mobile telephone 202, a telecommunications network 204, a switch 206, a call management system 208, at least one telephone/voice workstation 210, at least one modem 212, at least one agent workstation 100, a dynamic hospitality contact center application 110, a wide area network 214, at least one file server 216, a firewall 218, a local area network 220, a remote call management system 228, a data network 230, a remote personal computer 235, a communications interface 240, a transceiver 245, a hospitality center 250, an intercom station 260, a designated party 262, an affiliated telephone 264, and a personal identification transmitter 266. The intercom station 260 is similar to traditional intercom systems; however, intercom station 260 may further include an audio subsystem (not shown) for broadcasting and receiving audio messages, a video subsystem (not shown), typically a liquid crystal display (LCD), for displaying images, a keyboard and/or mouse for inputting and/or otherwise selecting commands and/or data, and an internal transceiver (not shown) for receiving signals from personal identification transmitter 266 and for sending signals to either the transceiver 245 or to the communications interface 240 so that the designated party 262 can be located within the hospitality center 250.

Typically, an individual (e.g., potential guest, current guest, supplier, business acquaintance, etc.) uses mobile phone 202 to place a call routed through telecommunication network 204 and switch 206 to the call management system 208 (to the called telephone number of the call center). Alternatively, the individual may use the personal computer 235 to gain access to the DHCC 200 through data network 230. If so, firewall 218 screens and routes the incoming communication over the WAN 214. The incoming communication (e.g., incoming call) is usually detected by an interactive response system (or similar system for communications initiated by personal computer 235) that provides intelligent routing of the call. For example, the individual may hear a prerecorded message prompting the individual to make an initial routing selection, such as, for example "Press 1 to place an order," "Press 2 to speak with a guest service representative," "Press 3 for directions," "If you know the extension of the party (i.e., the designated party), please press * and the party's four digit extension," and so on. Thus, the incoming communication may be initially routed to an appropriate agent (including agents connected with remote call management system 228) or to the extension of the designated party 262 (as described later, this extension may also be associated with a status of the designated party and the incoming communication may be further routed based on the status to the communications device). If the incoming communication is routed to the agent, then the call may be sent to the telephone/voice workstation 210 and/or through modem 212 to agent workstation 100. Further, the incoming communication and initial routing instructions provide information about the call to the telephone/voice workstation 210 and/or the agent workstation 100. For example, if the calling telephone number of the individual is decoded and/or if the individual provides a room number or another identifier, such as an account number, in response to an inquiry from the automated answering system (or if the account number is associated with other information like the ICLID signal of the calling number), then when the agent workstation 100 receives the incoming communication, the DHCC Application 110 may automatically associate, retrieve, and pull up associated information (associated using responses to the interactive response system and/or ICLID signal) with the incoming call. After the agent answers the incoming call, the agent may gather additional information from the individual, associate other data, identify the designated party 262 who can further handle the individual's needs, determine a status of the designated party 262, and based upon an available status, transfer the incoming communication and associated data to an appropriate communications device, such as the workstation intercom 260 or the work telephone 264. If the status is unavailable, then the agent may alternatively route the incoming communication and/or associated data to a messaging system, such as voicemail or pager number messaging.

The agent and/or the automated answering system determines the status of the designated party 262 by associating availability data of the designated party 262, location data of the designated party 262, availability data of the communications device, location data of the communications device, messaging delivery capability data of the communications device, and/or messaging delivery confirmation data with the communications device. Typically, the designated party 262 programs in protocols or rules related to his/her availability, location, and communications device. For example, the designated party 262 may input his/her work schedule including meetings, breaks, office hours and so on. Similarly, the designated party 262 may input specific times of unavailability (e.g., do not disturb), such as, for example, when the designated party is attending a giving a presentation. The location data of the designated party 262 and/or the communications device may also be used to determine a status of the designated party 262. In an embodiment, the designated party 262 wears a radio frequency (RF) transmitter 264 (or other means for identifying a location, such as, for example, a GPS transceiver or alternate location means) that transmits co-ordinates to nearby intercom station 260 in communication with transceiver 245 or that transmits co-ordinates directly to transceiver 245. The DHCC Application 110 maps the co-ordinates to associate a location with the hospitality center 250 (e.g., $3^{rd}$ floor/Island Grande building near Suite 311). The location data may be further associated with the availability data of the designated party 262 to determine the status, such as whether the designated party 262 is available to receive the incoming communication. For example, if the designated party is located in or proximate to a restroom, then the status of the designated party 262 is unavailable.

The availability data of the communications device may also be used to determine the status. For example, if the telephone 264 is off-hook, then the telephone 264 may be unavailable to receive the incoming communication and/or associated data. The telephone 264 may represent the extension of designated party 262 or, alternatively, telephone 264 may be associated with the designated party 262 through the communications profile and/or through determining the location of the designated party 262 and nearby facility communications devices (e.g., designated party is on $3^{rd}$ floor/Island Grande building near Suite 311 and proximate communications devices to Suite 311 include the intercom 260 in section 3A and the telephone T3-2 in section 3A). In addition, the location of the communications device may be used to determine the status. For example, telephone 264 may be located in a conference room with an ongoing meeting, and therefore, the telephone 264 would be unavailable. Still further, the messaging delivery capability of the communications device may be used to determine the status. For example, if the intercom station 260 has the means to display video images and text files, then the intercom station 260 would be available to receive associated video and files with the incoming communication. Finally, messaging delivery confirmation capabilities of the communications device may be used to determine the status. For example, if the telephone 260 is capable of providing a dual tone multi frequency signal, then the telephone 260 would be available to transmit a confirmation signal from the designated party 262 indicating that the incoming communications and/or associated data (including messages) has been delivered and received by the designated party.

The incoming communication and/or associated data may include voice, video, text, and/or other electronic data that is routed over the wide area network 214 through the communications interface 240 (or alternate communications means as shown in FIGS. 8-11) to the available communications device (e.g., the intercom station 260 and/or telephone 264). The communications interface 240 not only communicates the incoming communication and/or associated data, but also formats and/or otherwise configures the incoming communication and/or associated data (including messages transcribed by an agent) for the communications device. For example, the data stored on file server 216 may need to be converted from a data format compatible with the agent station 100 (and/or for storage on the file server 216) to another data format compatible with the communications device. The data formats may include printed text formats, a voice data formats, a video data formats, a dual tone multi-frequency data formats, and a digital data format (e.g., ASCII). In addition, the communications interface 240 may further include message delivery means that provide confirmation, such as a symbol or short message, that the communications device of the designated party 262 has received the incoming communication and/or associated data. Thus, the communications interface 240 advises an agent when there is a problem or error communicating the incoming communication (including associated data) with the communications device. If there is a problem or error, then the agent may select an alternate communications device (if the status is available) to communicate the incoming communication.

Figure 3:
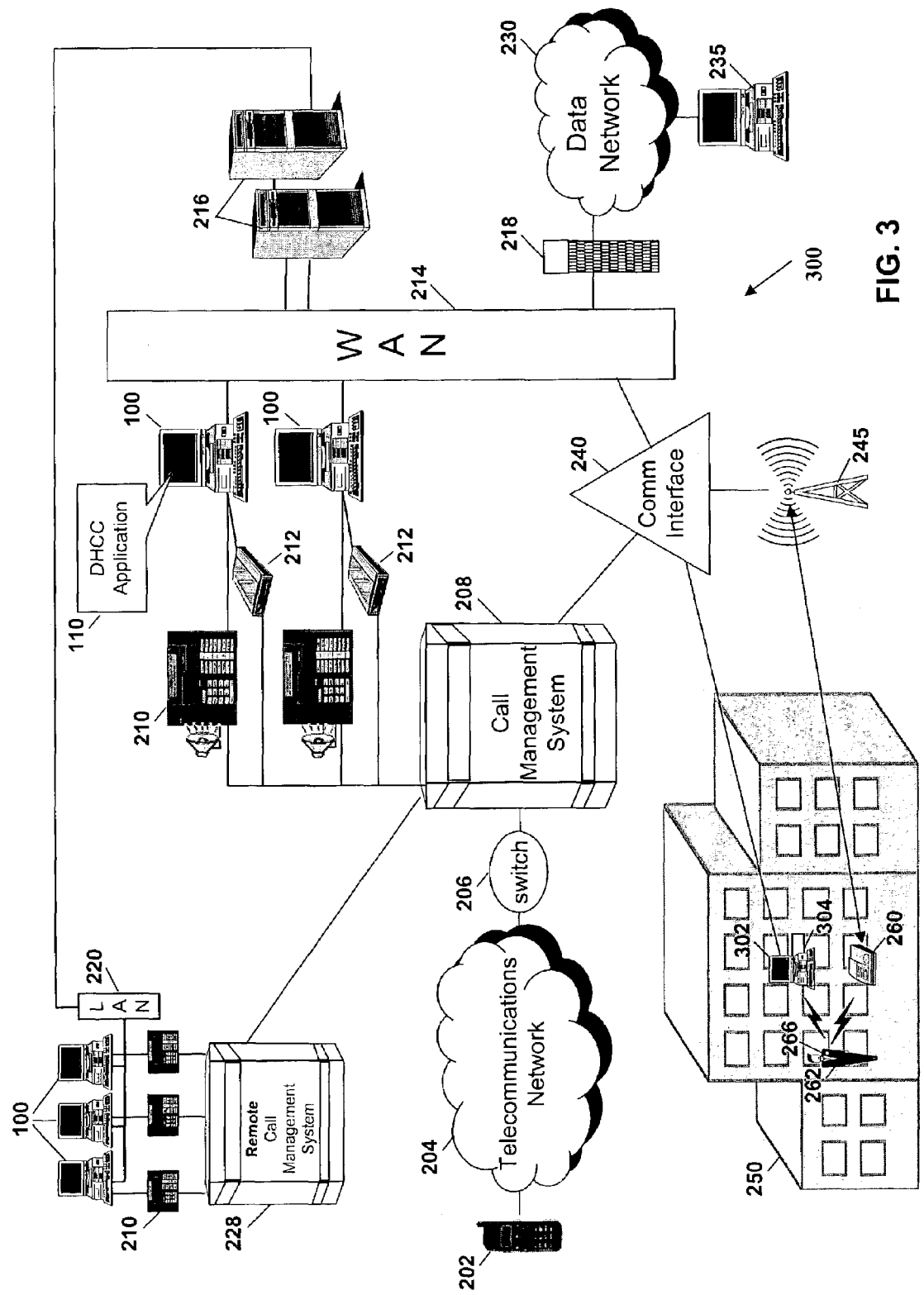
FIG. 3 is a schematic showing an exemplary operating environment for a dynamic hospitality contact center system that includes means for determining a status of a designated party and communicating with the designated party over a personal computer and/or an intercom station according to another embodiment of this invention.

FIG. 3 illustrates a dynamic hospitality contact center (DHCC) 300 similar to the DHCC 200 disclosed in FIG. 2. FIG. 3 further includes an affiliated computer workstation 302 coupled with the proprietary network of the communications system through communications interface 240. According to this embodiment, the agent (or a router of the automated answering system) receives the incoming communication and any associated data at his/her workstation 100, interacts with the individual, determines the status of the designated party 262, associates the status with the communications profile to select the nearby affiliated computer workstation 302, and provides the incoming communication and/or associated data to the workstation 302 for the designated party 262 to access. As discussed above, the communications interface 240 ensures that the incoming communication and/or associated data are formatted and/or otherwise configured for the workstation 302. Further, the incoming communication and/or associated data routed to workstation 302 may be encrypted or otherwise secured so that only the designated party 262 has access. For example, workstation 302 may include a biometrics sensor 304, such as, for example, a fingerprint ID device. The biometrics sensor 304 may provide security features that prevent unauthorized parties from exploiting the incoming communication and/or associated data. The biometrics sensor 304 could also comprise retina recognition device and software, DNA/RNA recognition device and software, facial recognition device and software, speech recognition device and software, and/or scent recognition device and software.

Figure 4:
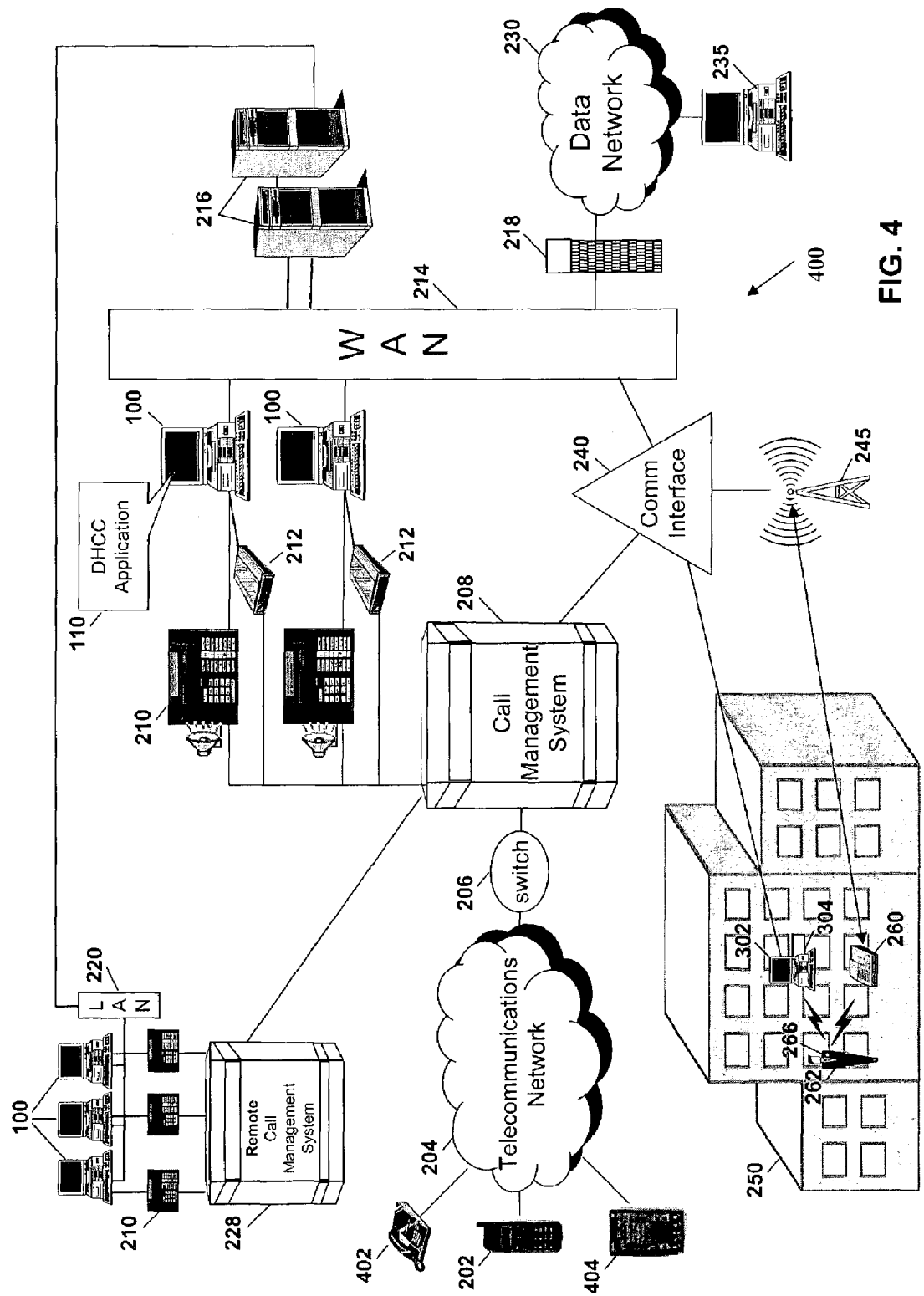
FIG. 4 is a schematic showing an exemplary operating environment for a dynamic hospitality contact center system that includes several guest communications devices for transceiving an incoming communication according to another embodiment of this invention.

FIG. 4 illustrates a dynamic hospitality contact center (DHCC) 400 similar to the DHCC 300 disclosed in FIG. 3. FIG. 4 further includes a POTS phone 402 and a personal digital assistant 404 to illustrate that the individual may use other wired and wireless communications devices to gain access to the call management 208 through telecommunications network 204.

Figure 5:
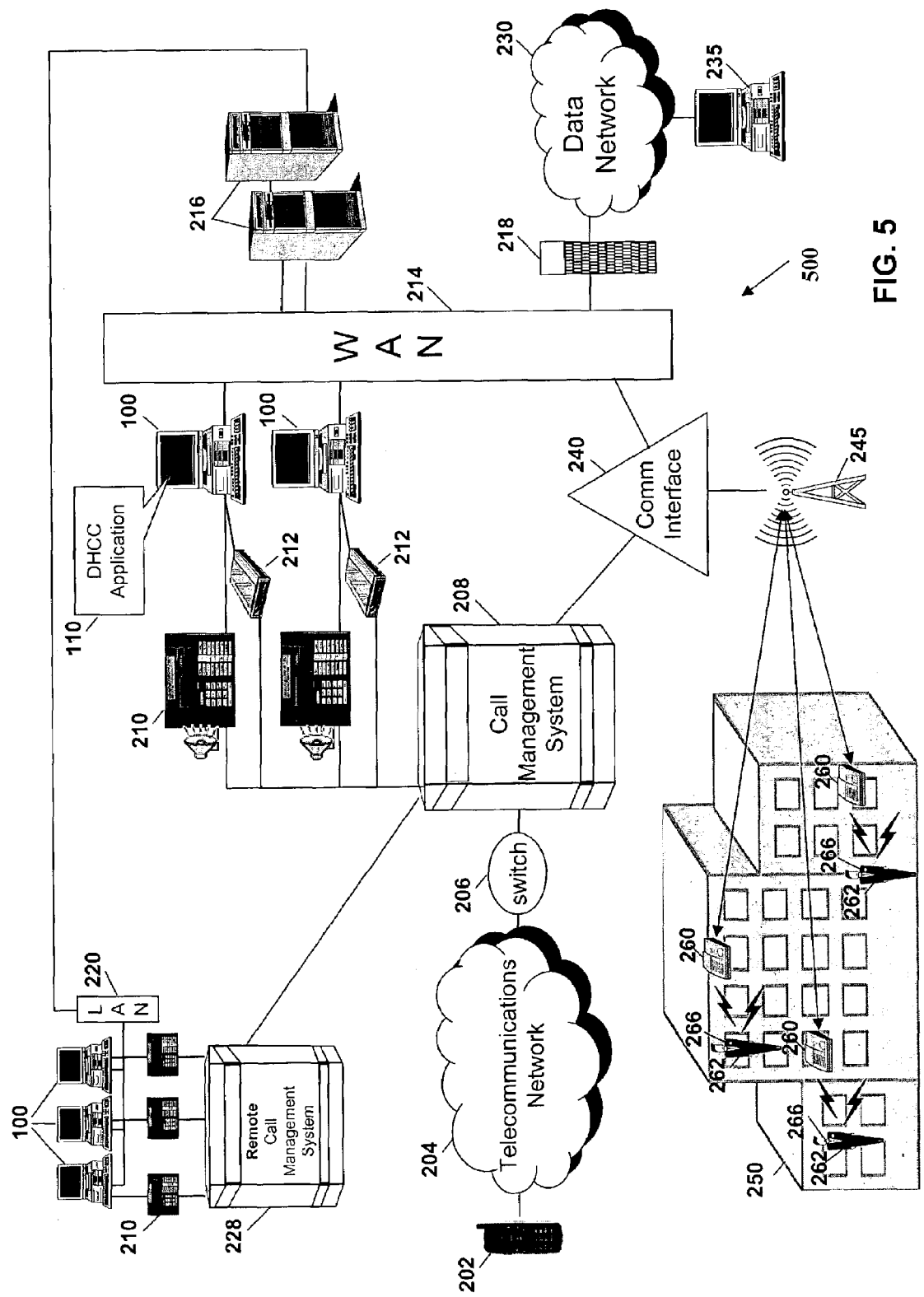
FIG. 5 is a schematic showing an exemplary operating environment for a dynamic hospitality contact center system that includes a plurality of intercom stations for determining a status and communicating with a plurality of designated parties according to another embodiment of this invention.

FIG. 5 illustrates a dynamic hospitality contact center (DHCC) 500 similar to the DHCC 300 disclosed in FIG. 3. However, FIG. 5 further includes a plurality of intercom stations 260 and a plurality of designated parties 262. According to this embodiment, the agent (or a router of the automated answering system) receives the incoming communication and any associated data at his/her workstation 100, interacts with the individual to identify multiple designated parties 262, determines the status of each of the designated parties 262, associates each status with one or more communications profiles to select a nearby intercom station 260 for each designated party 262, and provides the incoming communication and/or associated data to each intercom station 260 for each designated party 262 to access. The intercom stations 260 are connected and associated so that the incoming communication and responses to the incoming communication are shared with the group of designated parties 262. Accordingly, this conference feature determines the status of each designated party 262 in a group and simultaneously provides the incoming communications and responses from each available communications device to the group. While not shown, each designated party 262 of the group could be accessed through alternate available communications devices (such as telephone 260 shown in FIG. 2, personal computer 302 shown in FIG. 3, pager 810, personal digital assistant (PDA) 812, interactive pager 814, and mobile phone 816 shown in FIG. 8, MP3 1002, digital signal processor 1004, modem 1006, and GPS 1008 shown in FIG. 10, and interactive television 1108 shown in FIG. 11). As discussed above, the communications interface ensures that the incoming communication and/or associated data are formatted and/or otherwise configured for each communications device.

Figure 6:
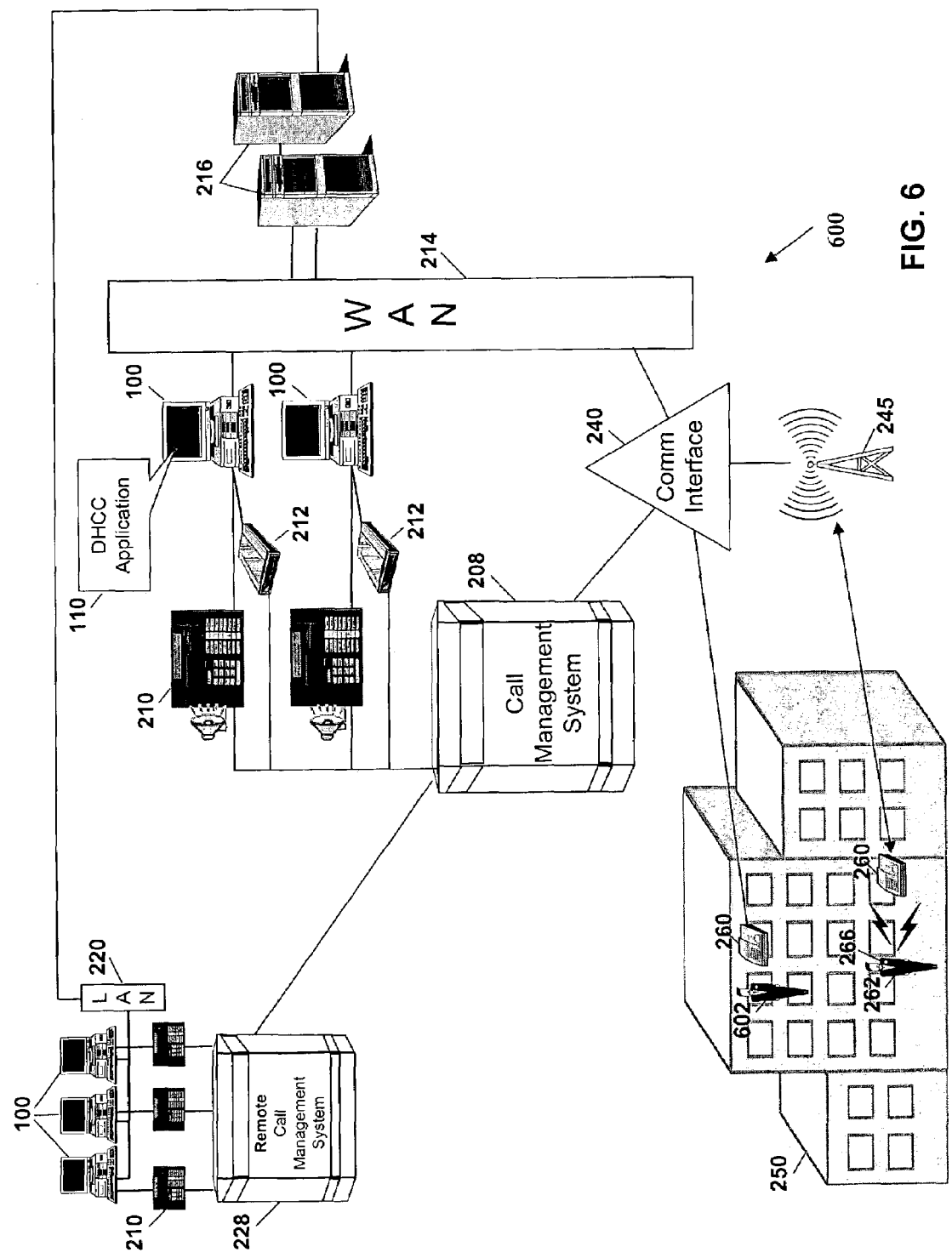
FIG. 6 is a schematic showing an exemplary operating environment for a dynamic hospitality contact center system that includes another staff member (and/or guest) utilizing an intercom station for determining a status and communicating an internal communication with a designated party according to another embodiment of this invention.

FIG. 6 illustrates a dynamic hospitality contact center 600 similar to the DHCC 500 of FIG. 5. However, according to the embodiment in FIG. 6, a staff member 602 initiates the incoming communication to the call center through intercom station 260. The agent (or automated answering system) receives the incoming communication and any associated data at his/her workstation 100, interacts with the staff member 602 to identify designated party 262, determines the status of the designated party 262, associates the status with the communications profile to select a nearby intercom station 260, and provides the incoming communication and/or associated data to the intercom station 260 for communications with the designated party 262. This embodiment illustrates the advantage of being able to internally use the DHCC 600 for staff to more easily locate and communicate with highly mobile on-site staff (e.g., network administrators, doctors, car salesman, etc.).

Figure 7:
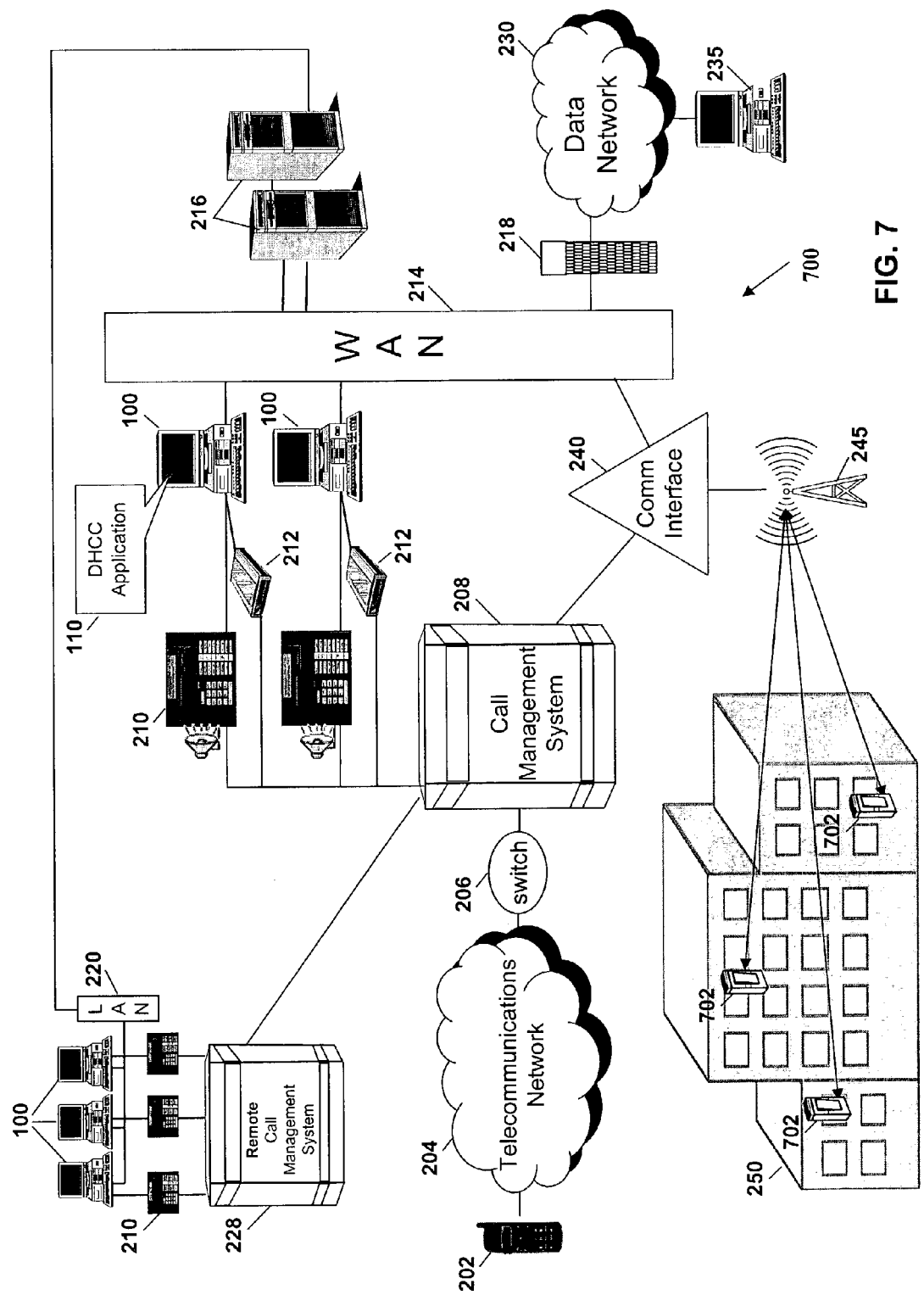
FIG. 7 is a schematic showing an exemplary operating environment for a dynamic hospitality contact center system that includes means for determining a status of a designated party having an on-site paging device according to another embodiment of this invention.

FIG. 7 illustrates a dynamic hospitality contact center (DHCC) 700 similar to the DHCC 500 disclosed in FIG. 5. However, FIG. 7 includes interactive, on-site messaging pagers 702 assigned to each designated party (not shown). According to this embodiment, the agent receives the incoming communication and any associated data at his/her workstation 100, interacts with the individual, determines the status of each designated party, associates the status with the communications profile to select the pager 702, and provides the incoming communication and/or associated data to the pager 702 for each designated party 262 to access. Since the interactive pagers 702 allow the designated party to respond to the incoming communication and/or data, this response can be shared with the other pagers 702 in the group.

Figure 8:
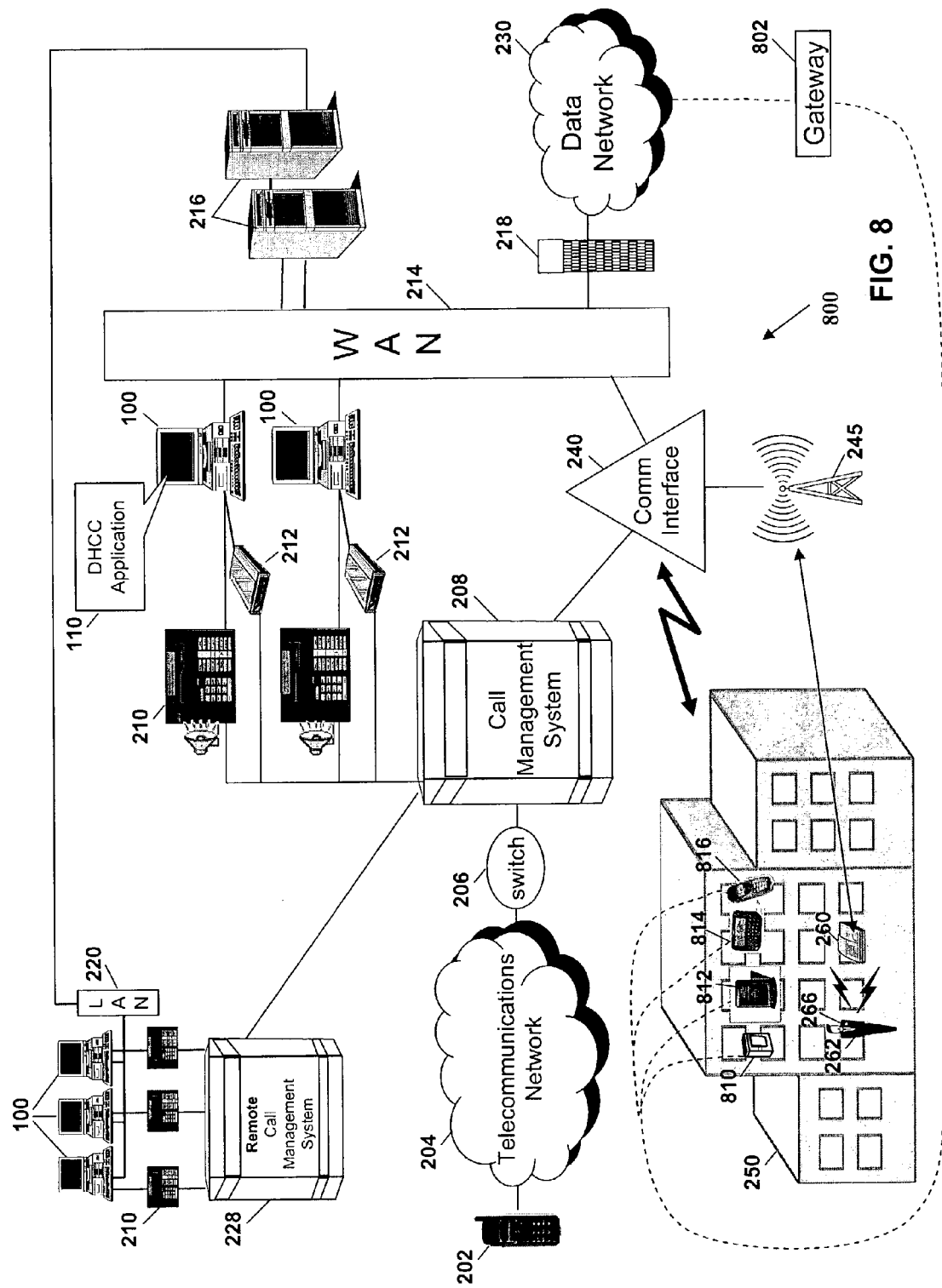
FIG. 8 is a schematic showing an exemplary operating environment for a dynamic hospitality contact center system that includes means for determining a status of a designated party and communicating with the designated party through an internal communications interface or a data network gateway to a wireless communications device according to another embodiment of this invention.
Figure 9:
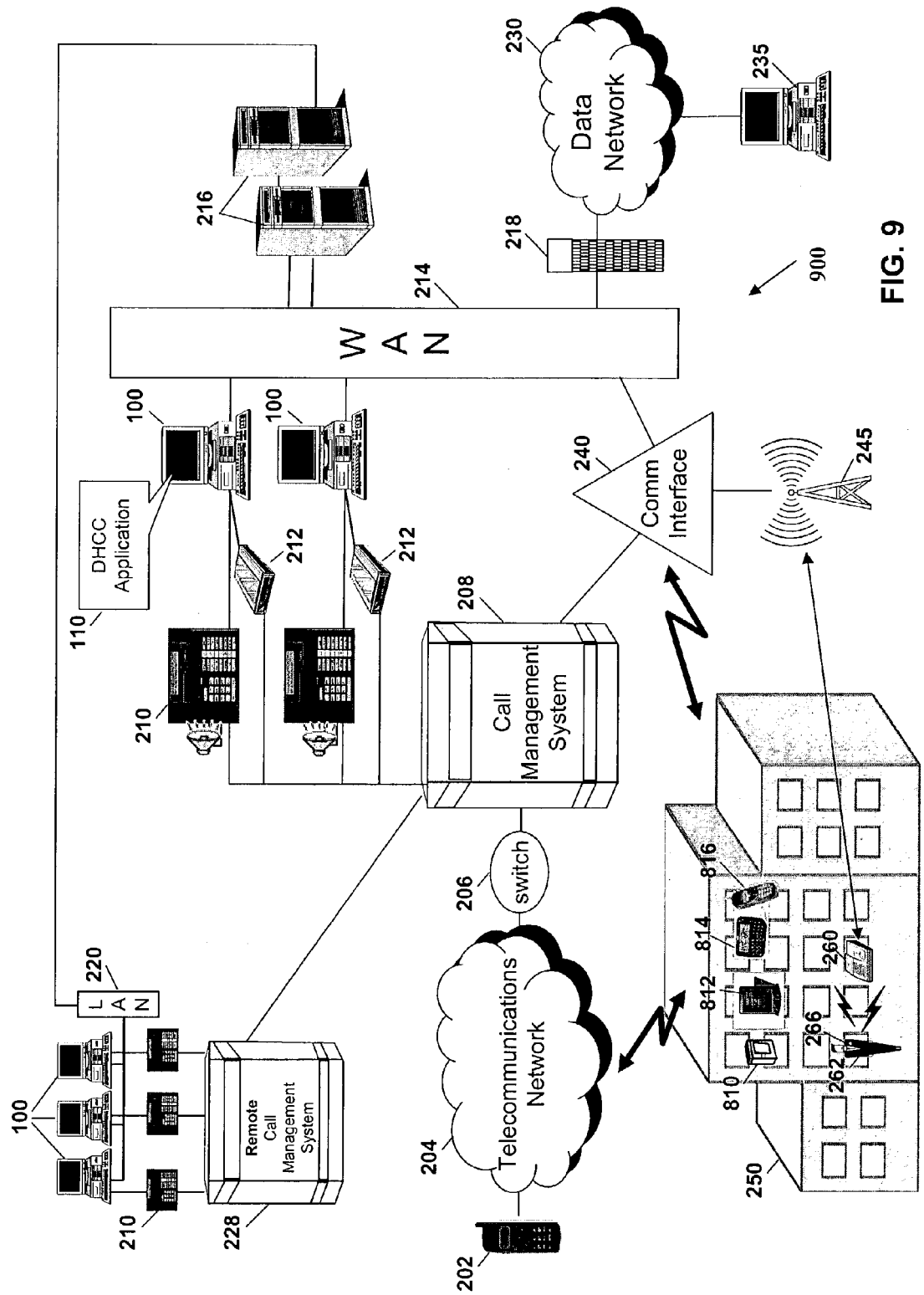
FIG. 9 is a schematic showing an exemplary operating environment for a dynamic hospitality contact center system that includes means for determining a status of a designated party and communicating with the designated party through an internal communications interface or a telecommunications network to a wireless communications device according to another embodiment of this invention.

FIG. 8 illustrates a dynamic hospitality contact center (DHCC) 800 similar to the DHCC 200 disclosed in FIG. 2. However, DHCC 800 further includes a gateway 802, a pager 810, a PDA 812, an on-site, interactive pager 814, and a mobile phone 816. According to this embodiment, the agent receives the incoming communication and any associated data at his/her workstation 100, interacts with the individual to identify the designated party 262, determines the status of the designated party 262, associates the status with the communications profile to select one or more of the communications devices (including the intercom station 260, the pager 810, the PDA 812, the on-site, interactive pager 814, and the mobile phone 816) to communicate with, and provides the incoming communication and/or associated data to selected communications devices. As discussed above, the communications interface 240 ensures that the incoming communication, associated data, and/or responses are formatted and/or otherwise configured for each of the selected communications devices. Alternatively, the incoming communication and/or associated data may be routed through firewall 218 to the data network 230 and the gateway 802 to each of the selected communications devices. An advantage of using the gateway 802 is that the gateway 802 may be provided by a manufacturer of the selected communications device for specialized formatting and/or other configuration of the incoming communication and/or associated data for presentation by the selected communications device, such as formatting a picture for display by the liquid crystal display (LCD) screen of the PDA 812. Still further, as shown in FIG. 9, the incoming communication, associated data, and/or responses of a dynamic hospitality contact center 900 are routed through the telecommunications network 204 (including the public switched telephone network (PSTN) and mobile switched telephone network (MTSO)). An advantage of using the telecommunications network 204 is to leverage the assets of other affiliated data, up-to-date formatting and configuration programs (including sharing the costs of these systems with other customers of the telecommunications network), and increased range of accessing off-site staff (e.g., when a staff member is not located at the hospitality center 250, the transmitter 266 and/or alternate communications devices, such as the mobile phone 818, could provide the means to determine the location, and consequently the status, of the designated party).

Figure 10:
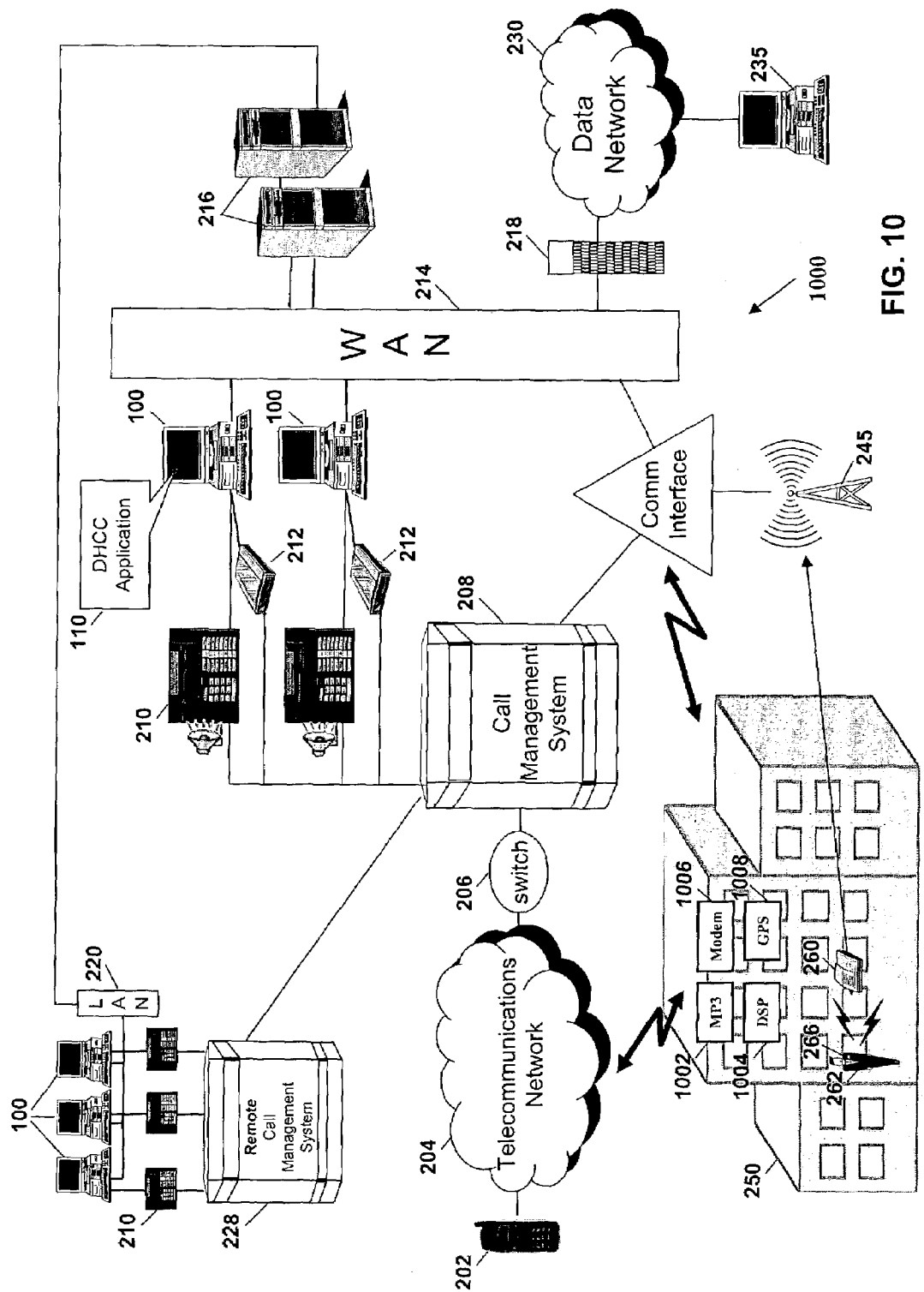
FIG. 10 is a schematic showing an exemplary operating environment for a dynamic hospitality contact center system that includes means for determining a status of a designated party and communicating with the designated party through an internal communications interface or a telecommunications network to alternate wireless communications device according to another embodiment of this invention.
Figure 11:
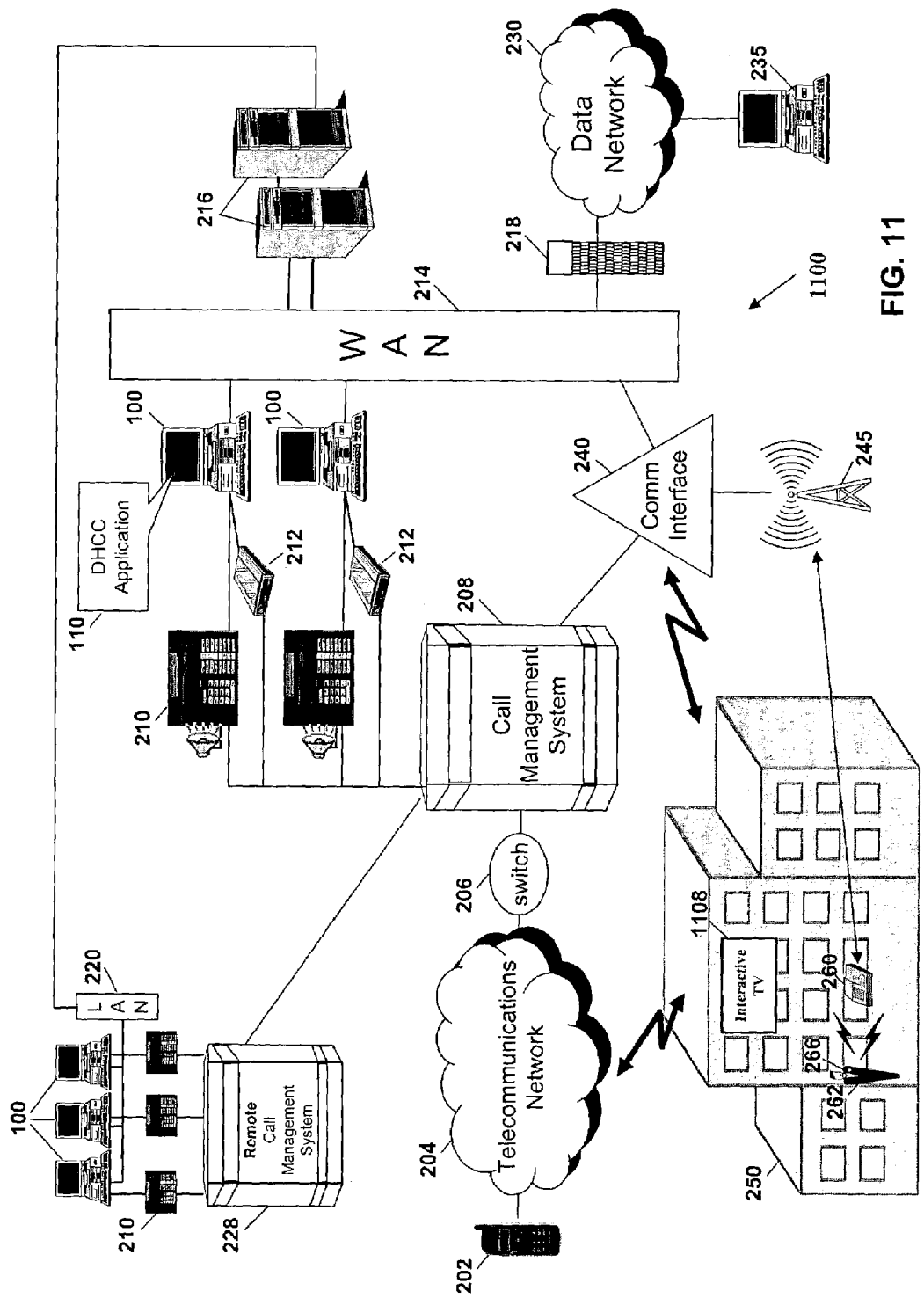
FIG. 11 is a schematic showing another exemplary operating environment with telecommunications and data networks for a dynamic hospitality contact center system that includes means for determining a status of a designated party and communicating with the designated party through an internal communications interface or a telecommunications network to another alternate wireless communications device according to an embodiment of this invention.

FIG. 10 illustrates a dynamic hospitality contact center (DHCC) 1000 similar to the DHCC 200 disclosed in FIG. 2. However, DHCC 1000 further includes a MP3 1002, a digital signal processor 1004, a modem 1006, and a global positioning system (GPS) 1008. According to this embodiment, the agent receives the incoming communication and any associated data at his/her workstation 100, interacts with the individual to identify the designated party 262, determines the status of the designated party 262, associates the status with the communications profile to select one or more of the communications devices (including the intercom station 260, the MP3 1002, the digital signal processor 1004, the modem 1006, and the GPS 1008) to communicate with, and provides the incoming communication and/or associated data to selected communications devices. As discussed above, the communications interface 240 and/or the telecommunications network 204 ensures that the incoming communication, associated data, and/or responses are formatted and/or otherwise configured for each of the selected communications devices. Alternatively, the incoming communication, associated data, and/or responses of a dynamic hospitality contact center 1000 may be routed through firewall 218 to the data network 230 and a gateway (not shown) to each of the selected communications devices. Still further, according to the embodiment depicted in FIG. 11, a dynamic hospitality contact center 1100 includes an interactive television 1108 for communicating the incoming communication, associated data, and/or responses.

Regardless of the communications device used to communicate the incoming communication, associated data, and/or responses, this information may need to be formatted accordingly for the receiving communications device (including audio, text (e.g., ASCII), video, other digital formats, and combination thereof). Accordingly, the DHCC DataServer 42 (via the communications profile) has the intelligence to associate the presentation capabilities of each of the receiving communications devices described in FIGS. 2-11 and to communicate the incoming communication (and associated data and response) to a communications interface (such as communications interface 240 or the gateway 802) for appropriate formatting. For example, if the alternate communications device uses the Wireless Application Protocol (WAP) technique, then the incoming communication and/or associated data are formatted using the Wireless Mark-up Language (WML). The Wireless Mark-up Language (WML) and the WAP technique are known and will not be further described. This is a description of a solution for a specific wireless protocol, such as WAP. This solution may be clearly extended to other wireless protocol, such as i-mode, VoiceXML (Voice eXtensible Markup Language), Dual Tone Multi-Frequency (DTMF), and other signaling means.

Figure 12:
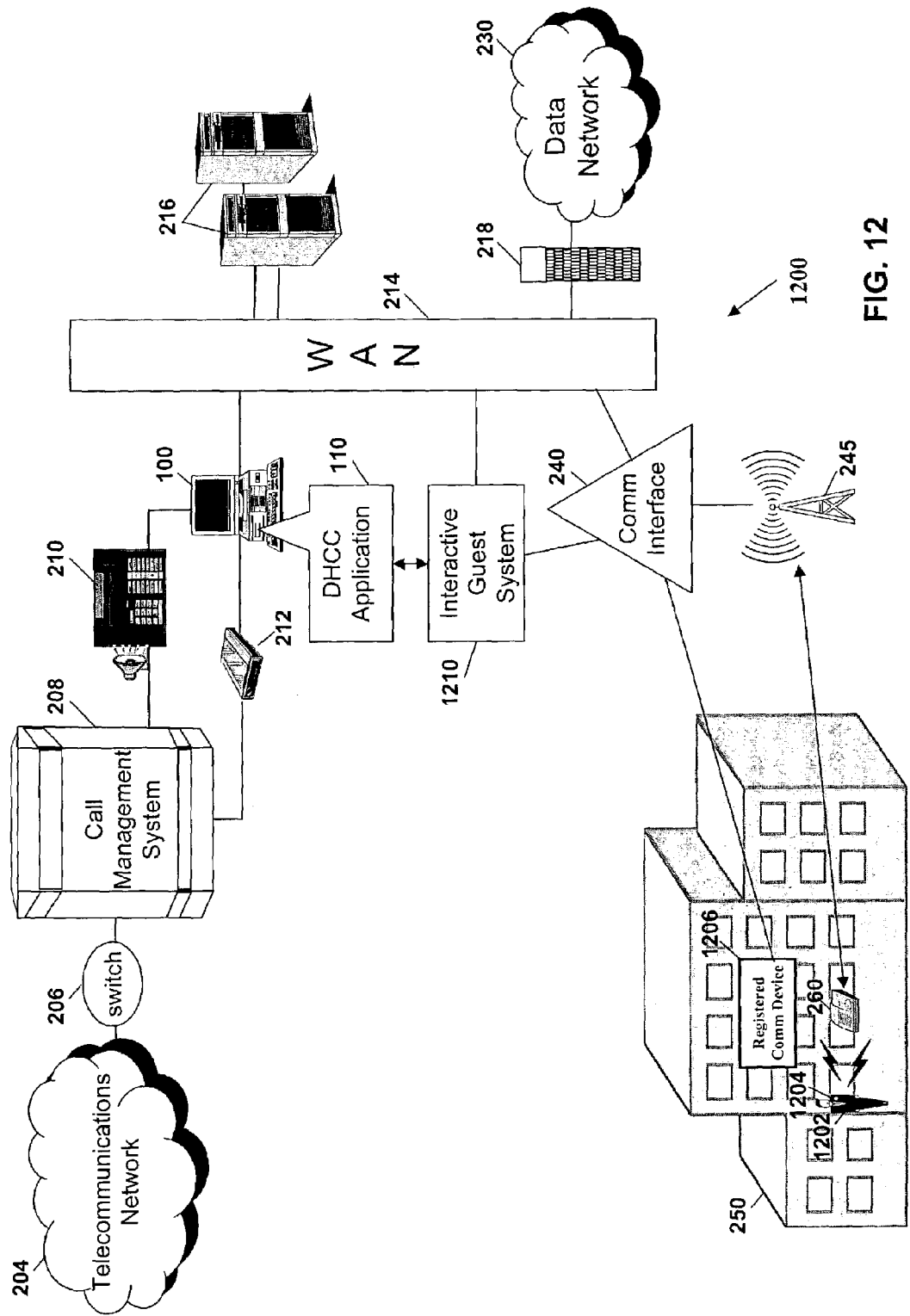
FIG. 12 is a schematic showing another exemplary operating environment of a dynamic hospitality contact center system that includes an interface with a interactive guest services system for determining a status of a designated party and communicating with the designated party according to an embodiment of this invention.

FIG. 12 is a schematic showing an exemplary operating environment for a dynamic hospitality contact center (DHCC) 1200 that further includes an interface with an interactive guest services system 1210. The DHCC 1200 has many of the components of FIG. 2 including the telecommunications network 204, the switch 206, the call management system 208, the telephone/voice workstation 210, the modem 212, the agent workstation 100, the dynamic hospitality contact center application 110, the wide area network 214, at least one file server 216, the firewall 218, the data network 230, the remote personal computer 235, the communications interface 240, the transceiver 245, the hospitality center 250, and the intercom station 260. However, DHCC further includes a guest 1202, a guest signaling key 1204, a registered communications ("Comm") device 1206, and the interactive guest services system 1210. The interactive guest services system allows the guest 1202 to manage hospitality services, such as, for example, business services (e.g., reserving conference rooms, receiving faxes, mail, renting business equipment, etc.), entertainment services (e.g., movies, games, music, etc.), hotel services (e.g., wake-up calls, linens, bellmen, valet, maintenance, etc.), concierge services, restaurant services (e.g., room service), travel services (e.g., taxis), tourist services, and childcare services. The guest may interact with the interactive guest services systems prior to arrival (sending or inputting a guest profile with the hospitality center) or after arrival to manage his/her guest profile. While several interactive guest services are known in the art, none of them allow the guest 1202 to register for call center services of the hospitality center 250. Accordingly, this invention allows the guest 1202 to use the interactive guest services to register for DHCC services by providing a list of communications devices affiliated with a guest (so that the DHCC application can format and/or otherwise configure incoming communications and/or associated data for the communications device), routing addresses of the communications devices such as radio frequency identifiers, service node addresses (e.g., telephone numbers), IP addresses, email addresses, and/or other electronic address information, and times, dates, and/or other schedules for availability of each communications device (e.g., Type of communications device: POTS phone, Address: 504-596-3807, When Available to Answer Phone: 9 AM-5 PM). Once the guest provides a registered communications device 1206 (such as telephone 260 shown in FIG. 2, personal computer 302 shown in FIG. 3, pager 810, personal digital assistant (PDA) 812, interactive pager 814, and mobile phone 816 shown in FIG. 8, MP3 1002, digital signal processor 1004, modem 1006, and GPS 1008 shown in FIG. 10, and interactive television 1108 shown in FIG. 11), the DHCC 1200 can communicate incoming communications (and associated data) through communications interface 240 similar to the above embodiments. Alternatively, the guest may participate in the DHCC 1200 by using a guest signaling key 1204 that transmits signals either to the nearby intercom station 260 or to the transmitter 245. Once the guest elects to participate using the guest signaling key 1204, the DHCC application 110 associates the guest 1202 (including guest profile and information stored in the interactive guest services system 1210) with the transmitted signals that are used to locate the guest 1202 and provide availability data and/or location data of the guest 1202. Similar to the availability data and/or location data of the designated part 262, the availability data and/or location data of the guest are used to determine the status of the guest. In addition, the guest signaling key 1204 may further include an ON/OFF switch that enables or disables the key 1204 from transmitting signals. For example, if the guest 1202 turned the switch OFF, then the key 1204 would not transmit signals and the guest 1202 could not be located by the key 1204.

Figure 13:
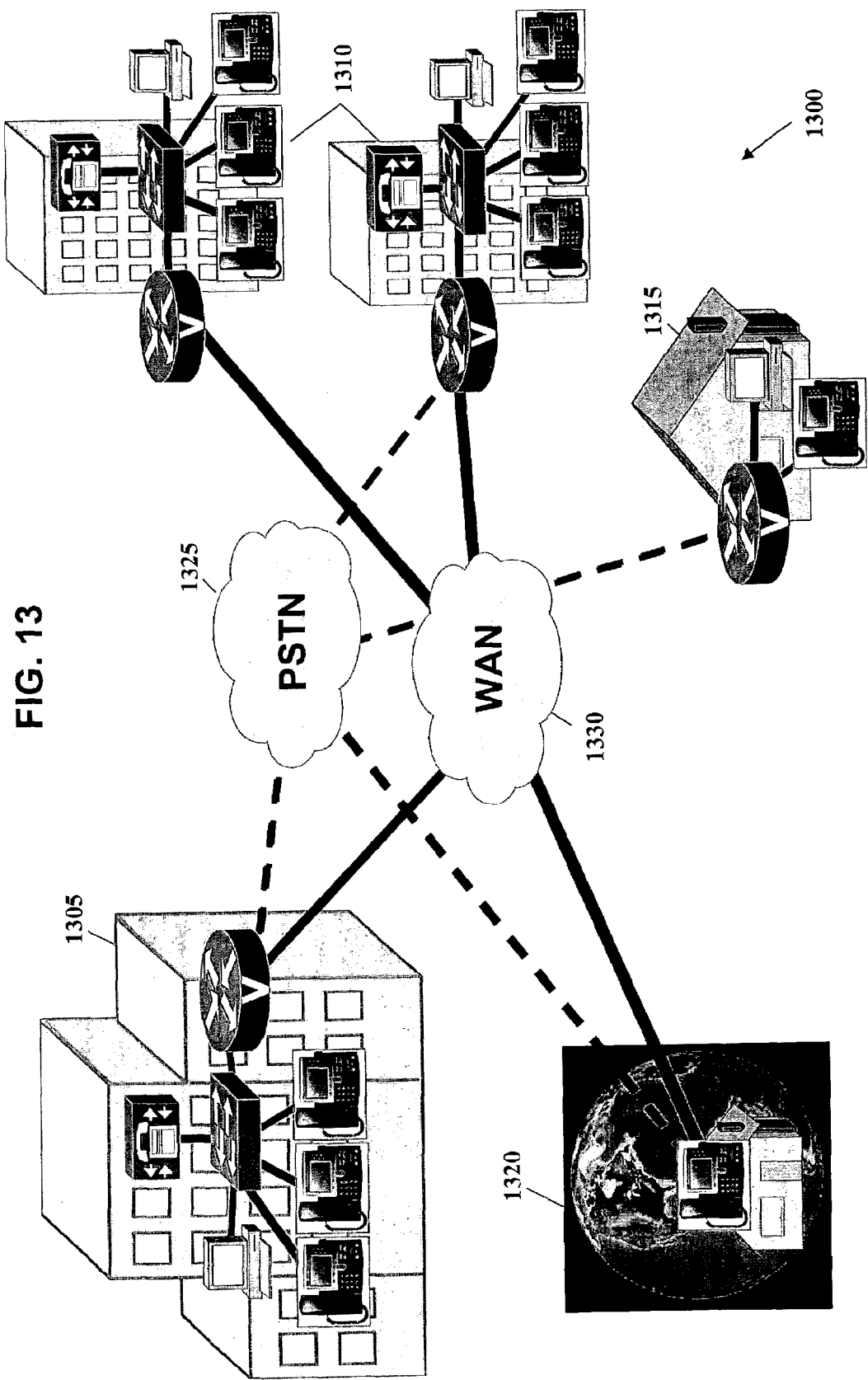
FIG. 13 is a schematic of an exemplary operating environment of a dynamic hospitality contact center system communicating with other systems over a telecommunications and/or data network.

Referring now to FIG. 13, a dynamic hospitality contact center (DHCC) 1305 leverages the assets of a telecommunications network provided by PSTN 1325 and a wide area network 1330 to interconnect with remote hospitality center affiliated sites 1310, a remote authorized user 1315 (e.g., a staff member working remotely from home), and other third party 1320. Similar to the embodiments described above, the means of coupling the DHCC 1305, the affiliated hospitality center sites 1310, the remote authorized user 1315, the third party, the PSTN 1325 and the WAN 1330 include a variety of means, including optical transmission of electronic data, wireless transmission of electronic data, and/or fixed-wire transmission of electronic data (e.g., via a local loop of a telecommunications network to communicate electronic data). Fiber optic technologies, spectrum multiplexing (such as Dense Wave Division Multiplexing), Ethernet and Gigabit Ethernet services, and Digital Subscriber Lines (DSL) are just some examples of the coupling means. For example, the DHCC 1300 may utilize SmartRing, AVVID & Frame Relay, and SS7 VC interconnections. Accordingly, the telecommunications network 204 may include Advanced Intelligent Network (AIN) componentry that may be programmed to control features of the DHCC 1300, such as locating a designated party off-site and adding the off-site designated party to a group conference of the incoming communication, associated data, and/or responses (e.g., a mobile phone of the designated party could be located using fingerprinting or other techniques in the art, this location could be associated with a status, and the agent could process the incoming communication according to the status). The signaling between the DHCC 1305, the affiliated hospitality center sites 1310, the remote authorized user 1315, the third party, the PSTN 1325 including AIN componentry, and the WAN 1330 are well understood in by those of ordinary skill the art and will not be further described. Further, those of ordinary skill in the art will be able to apply the principles of this invention to their own communications systems including their network configurations which may differ substantially from the leveraging the telecommunications network (shown as reference numeral 1325 in FIG. 13, and alternatively, as reference numeral 204 in FIGS. 2-11), the WAN (shown as reference numeral 1330 in FIG. 13, and alternatively, as reference numeral 214 in FIGS. 2-11), and the data network (shown as reference numeral 230 in FIGS. 2-11).

While several exemplary implementations of embodiments of this invention are described herein, various modifications and alternate embodiments will occur to those of ordinary skill in the art. For example, the DHCC 200 may include wired, optical, and/or wireless components and/or other components (not shown). The DHCC 200 may use any means of coupling each of the electronic components for communicating the incoming communication and/or associated data, but the coupling means is preferably high-capacity, high-bandwidth optical transport services, Gigabit Ethernet services, and/or the like. As those of ordinary skill in the art of computer telephony integration understand, the electronic components could also be coupled using other appropriate means, such as, for example a Synchronous Optical Network (SONET) structure with redundant, multiple rings. Copper conductors may also be used. Accordingly, this invention is intended to include those other variations, modifications, and alternate embodiments that adhere to the spirit and scope of this invention.

What is claimed is:

1. A computer telephony integration system, comprising:
    means for detecting an incoming communication to a hospitality call management system that intelligently routes the incoming communication to a designated party, the designated party having a plurality of communications devices which may receive the incoming communication;
    means for associating a communications profile with the incoming communication, the communications profile comprising (1) address data associated with the incoming communication, (2) data associated with the designated party, (3) data associated with at least one configuration profile of the plurality of communications devices, (4) data associated with one or more communications systems of a hospitality call center, and (5) a room number associated with the designated party;
    means for determining a status of each of the designated party's plurality of communications devices, the status comprising availability data of the designated party, location data of the designated party, availability data of each communications device, a messaging delivery capability of each communications device, and a messaging confirmation capability for confirming delivery of at least one of the incoming communication and the data to the communications device, the messaging delivery capability of each communications device describing each communications device's capability to present audio, to present video, and to present digital data;
    means for mapping the location data associated with the designated party to determine the designated party's location within a hospitality center;
    if the designated party's location indicates the designated party is unavailable to receive the incoming communication, then means for routing the incoming communication to an agent's station;
    if the designated party's location indicates the designated party is proximate to a restroom within the hospitality center, then means for routing the incoming communication to an agent's station;
    if the designated party is available to receive the incoming communication, then means for routing the incoming communications to a selected communications device of the designated party's plurality of communications devices, the selected communications device having the status to receive and to present the incoming communication;
    if the designated party is available to receive the incoming communication, but the designated party's plurality of communications devices are unavailable, then, based on the designated party's location, means for routing the incoming communication to a nearby facility communications device that is proximate to the designated party's location within the hospitality center; and
    means for receiving a messaging confirmation notification that confirms presentation of the incoming communication at the selected communications device.

2. The system of claim 1, further comprising means for receiving an indication that the incoming communication was received at the designated party's selected communications device.

3. The system of claim 1, further comprising means for converting the incoming communication from a first data format compatible with the agent station to a second data format compatible with the selected communications device.

4. The system of claim 3, wherein the first data format comprises at least one of printed text format, a voice data format, a video data format, a dual-tone multi-frequency data format, and a digital data format.

5. The system of claim 1, wherein the second data format comprises at least one of printed text format, a voice data format, a video data format, a dual-tone multi-frequency data format, and a digital data format.

6. The system of claim 1, further comprising means for receiving location coordinates describing the location of the designated party.

7. The system of claim 1, wherein when the nearby facility communications device is within a conference room with an ongoing meeting, then determining the status of the nearby facility communications device as unavailable to receive the incoming communication.

8. The system of claim 1, further comprising means for associating the location data to the availability data of the designated party.

9. The system of claim 1, further comprising means for associating the location data to the availability data of each communications device.

10. A method, comprising:
    detecting an incoming communication to a hospitality call management system that intelligently routes the incoming communication to a designated party, the designated party having a plurality of communications devices which may receive the incoming communication;
    associating a communications profile with the incoming communication, the communications profile comprising (1) address data associated with the incoming communication, (2) data associated with the designated party, (3) data associated with at least one configuration profile of the plurality of communications devices, (4) data associated with one or more communications systems of a hospitality call center, and (5) a room number associated with the designated party;
    determining a status of each of the designated party's plurality of communications devices, the status comprising availability data of the designated party, location data of the designated party, availability data of each communications device, a messaging delivery capability of each communications device, and a messaging confirmation capability for confirming delivery of at least one of the incoming communication and the data to the communications device, the messaging delivery capability of each communications device describing each communications device's capability to present audio, to present video, and to present digital data;
    mapping the location data associated with the designated party to determine the designated party's location within a hospitality center;
    if the designated party's location indicates the designated party is unavailable to receive the incoming communication, then routing the incoming communication to a agent's station;
    if the designated party's location indicates the designated party is proximate to a restroom within the hospitality center, then routing the incoming communication to an agent's station;
    if the designated party is available to receive the incoming communication, then routing the incoming communications to a selected communications device of the designated party's plurality of communications devices, the selected communications device having the status to receive ad to present the incoming communication;
    if the designated party is available to receive the incoming communication, but the designated party's plurality of communications devices are unavailable, then, based on the designated party's location, routing the incoming communication to a nearby facility communications device that is proximate to the designated party's location within the hospitality center; and
    receiving a messaging confirmation notification that confirms presentation of the incoming communication at the selected communications device.

11. The method of claim 10, wherein associating the communications profile with the incoming communication comprises accessing a hospitality call center application for managing the communications profile.

12. The method of claim 11, further comprising converting the incoming communication from a first data format compatible with the agent station to a second data format compatible with the selected communications device.

13. The method of claim 12, wherein the first data format comprises at least one of printed text format, a voice data format, a video data format, a dual-tone multi-frequency data format, and a digital data format.

14. The method of claim 12, wherein the second data format comprises at least one of printed text format, a voice data format, a video data format, a dual-tone multi-frequency data format, and a digital data format.

15. The method of claim 10, further comprising receiving an indication that the incoming communication was received at the designated party's selected communications device.

16. The method of claim 10, further comprising receiving location coordinates describing the location of the designated party.

17. The method of claim 10, wherein when the nearby facility communications device is within a conference room with an ongoing meeting, then determining the status of the nearby facility communications device as unavailable to receive the incoming communication.

18. A computer readable memory on which is encoded instructions for performing a method, the method comprising:
    detecting an incoming communication to a hospitality call management system that intelligently routes the incoming communication to a designated party, the designated party having a plurality of communications devices which may receive the incoming communication;
    associating a communications profile with the incoming communication, the communications profile comprising (1) address data associated with the incoming communication, (2) data associated with the designated party, (3) data associated with at least one configuration profile of the plurality of communications devices, (4) data associated with one or more communications systems of a hospitality call center, and (5) a room number associated with the designated party;
    determining a status of each of the designated party's plurality of communications devices, the status comprising availability data of the designated party, location data of the designated party, availability data of each communications device, a messaging delivery capability of each communications device, and a messaging confirmation capability for confirming delivery of at least one of the incoming communication and the data to the communications device, the messaging delivery capability of each communications device describing each communications device's capability to present audio, to present video, and to present digital data;

mapping the location data associated with the designated party to determine the designated party's location within a hospitality center;

if the designated party's location indicates the designated party is unavailable to receive the incoming communication, then routing the incoming communication to an agent's station;

if the designated party's location indicates the designated party is proximate to a restroom within the hospitality center, then routing the incoming communication to an agent's station;

if the designated party is available to receive the incoming communication, then routing the incoming communications to a selected communications device of the designated party's plurality of communications devices, the selected communications device having the status to receive and to present the incoming communication;

if the designated party is available to receive the incoming communication, but the designated party's plurality of communications devices are unavailable, then, based on the designated party's location, routing the incoming communication to a nearby facility communications device that is proximate to the designated party's location within the hospitality center; and receiving a messaging confirmation notification that confirms presentation of the incoming communication at the selected communications device.

19. The computer readable memory of claim 18, further comprising instructions for performing:

if the messaging confirmation notification identifies that the incoming communication is not communicated to the selected communications device, then routing the incoming communication to an alternate communications device; and if the messaging confirmation notification identifies that the incoming communication is communicated, then presenting the messaging confirmation notification.

* * * * *